(12) United States Patent
Izumi et al.

(10) Patent No.: US 11,472,169 B2
(45) Date of Patent: Oct. 18, 2022

(54) METAL LAMINATE AND MANUFACTURING METHOD OF METAL LAMINATE

(71) Applicant: MITSUI HIGH-TEC, INC., Fukuoka (JP)

(72) Inventors: Masahiro Izumi, Fukuoka (JP); Makoto Haraguchi, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 185 days.

(21) Appl. No.: 16/507,607

(22) Filed: Jul. 10, 2019

(65) Prior Publication Data
US 2020/0039203 A1 Feb. 6, 2020

(30) Foreign Application Priority Data
Jul. 31, 2018 (JP) .............................. JP2018-143615

(51) Int. Cl.
*B32B 15/00* (2006.01)
*B21D 39/03* (2006.01)
(Continued)

(52) U.S. Cl.
CPC .............. *B32B 37/10* (2013.01); *B21D 28/02* (2013.01); *B21D 39/03* (2013.01); *B32B 7/05* (2019.01);
(Continued)

(58) Field of Classification Search
None
See application file for complete search history.

(56) References Cited

U.S. PATENT DOCUMENTS 5,992,003 A * 11/1999 Elliott ................... H02K 15/02
29/596

FOREIGN PATENT DOCUMENTS

EP 1481795 12/2004
EP 11481795 12/2004
(Continued)

OTHER PUBLICATIONS

Tokuo Torisu, machine translation JP H0-7185695 Abstract and Description, Jul. 25, 1995 (Year: 1995).*
(Continued)

*Primary Examiner* — Mary I Omori
(74) *Attorney, Agent, or Firm* — Greenblum & Bernstein, P.L.C.

(57) ABSTRACT

A metal laminate includes a lamination of a first metal plate and a second metal plate. The first metal plate includes a caulking that exhibits a mountain shape protruding from a back surface side and recessed on a front surface side, and the second metal plate includes an accommodating portion configured to accommodate the caulking such that the caulking is fitted to the accommodating portion. The caulking includes a recessed portion provided on an inner concave surface of the caulking and recessed toward the back surface side of the first metal plate, and an abutting portion provided on an outer convex surface of the caulking and abutted against an inner surface of the accommodating portion at a
(Continued)

position corresponding to the recessed portion. The abutting portion expands laterally from the outer convex surface toward the inner surface of the accommodating portion.

3 Claims, 15 Drawing Sheets

(51) Int. Cl.
*B32B 37/10* (2006.01)
*B32B 15/01* (2006.01)
*H02K 15/02* (2006.01)
*B32B 7/05* (2019.01)
*B21D 28/02* (2006.01)
*H02K 1/27* (2022.01)
*H01F 41/02* (2006.01)
*H02K 1/06* (2006.01)

(52) U.S. Cl.
CPC ............. *B32B 15/01* (2013.01); *H02K 15/02* (2013.01); *H01F 41/02* (2013.01); *H02K 1/06* (2013.01); *H02K 1/27* (2013.01); *H02K 2201/09* (2013.01); *Y10T 29/49078* (2015.01)

(56) References Cited

FOREIGN PATENT DOCUMENTS

| | | | | |
|---|---|---|---|---|
| JP | S61-249635 | | 11/1986 | |
| JP | 07185695 A | * | 7/1995 | |
| JP | 2006-025533 | | 1/2006 | |
| JP | 2007-14122 A | | 1/2007 | |
| JP | 2009-226414 | | 10/2009 | |
| JP | 2010130824 A | * | 6/2010 | |
| JP | 2011130549 A | * | 6/2011 | |
| JP | 2011151923 A | * | 8/2011 | |
| WO | WO-2009005179 A1 | * | 1/2009 | ............. F16J 15/064 |

OTHER PUBLICATIONS

Akihiro Hashimoto, machine translation JP 2010-130824 Abstract and Description, Jun. 10, 2010 (Year: 2010).*
Shigematsu et al., machine translation JP 2011-130549 Abstract and Description, Jun. 30, 2011 (Year: 2011).*
Nagai et al., machine translation of JP 2011-151923 Abstract and Description, Aug. 4, 2011 (Year: 2011).*
Official Communication issued in European Patent Office (Epo) Patent Application No. 19183537.0, dated Dec. 4, 2019.

* cited by examiner

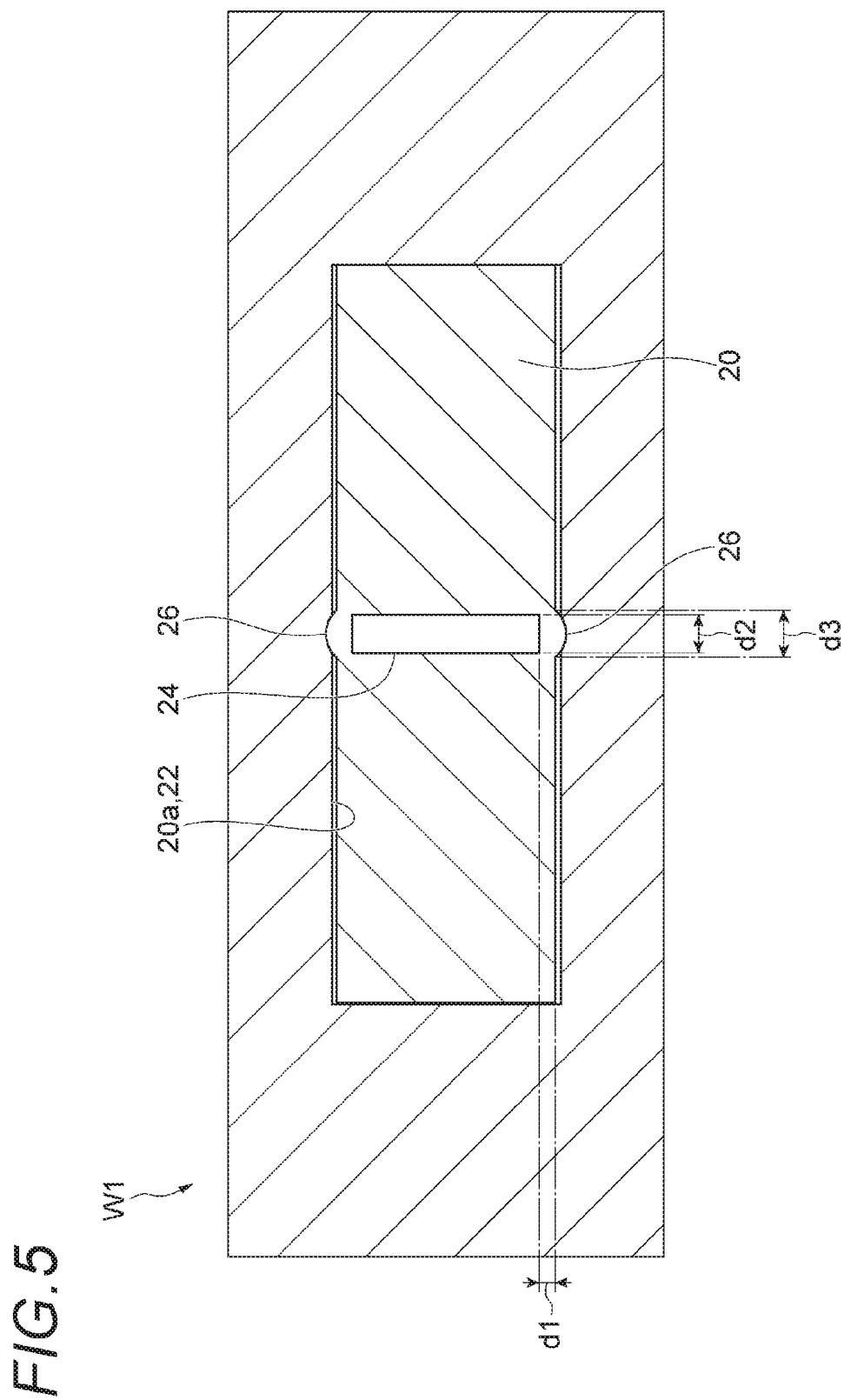

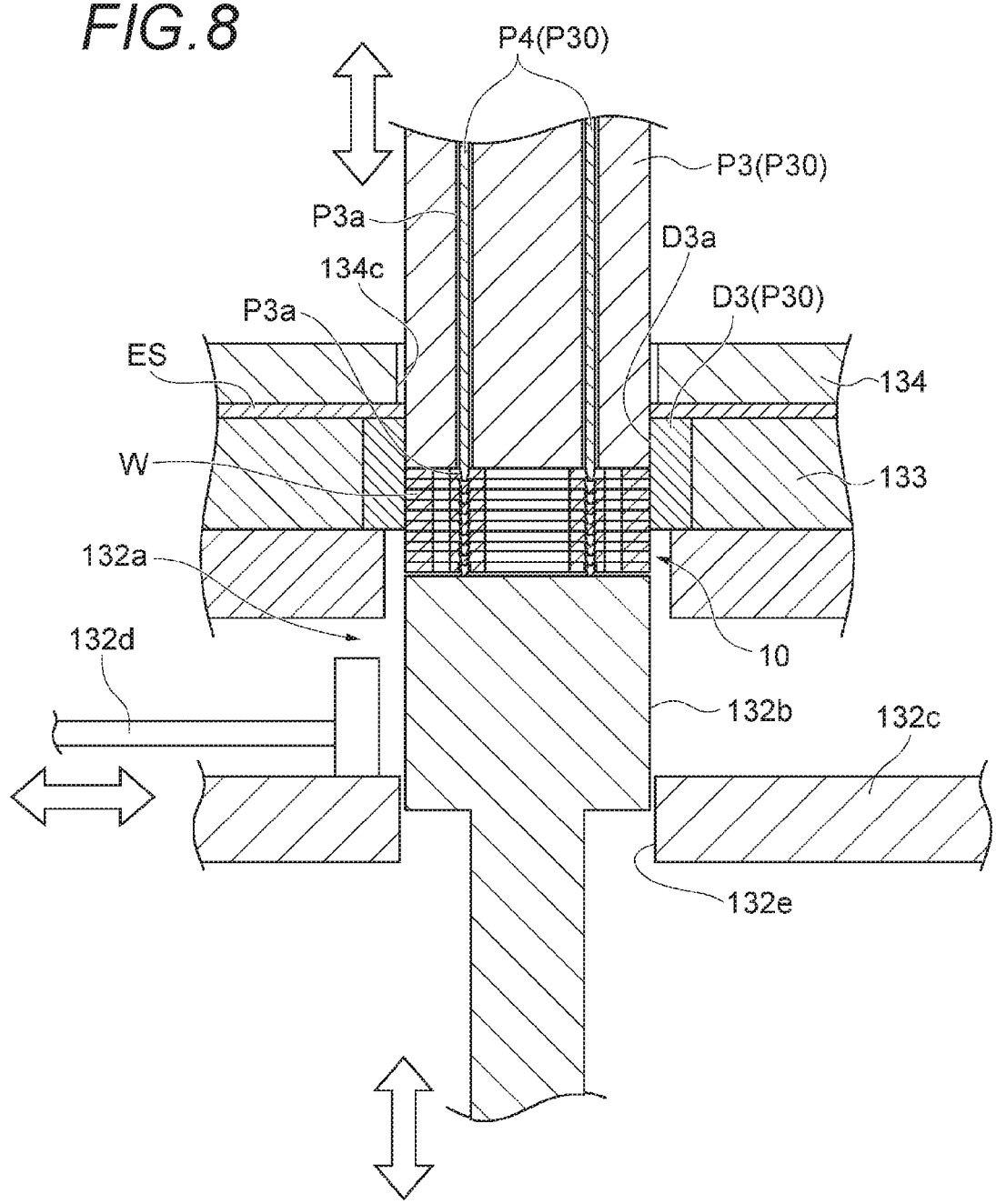

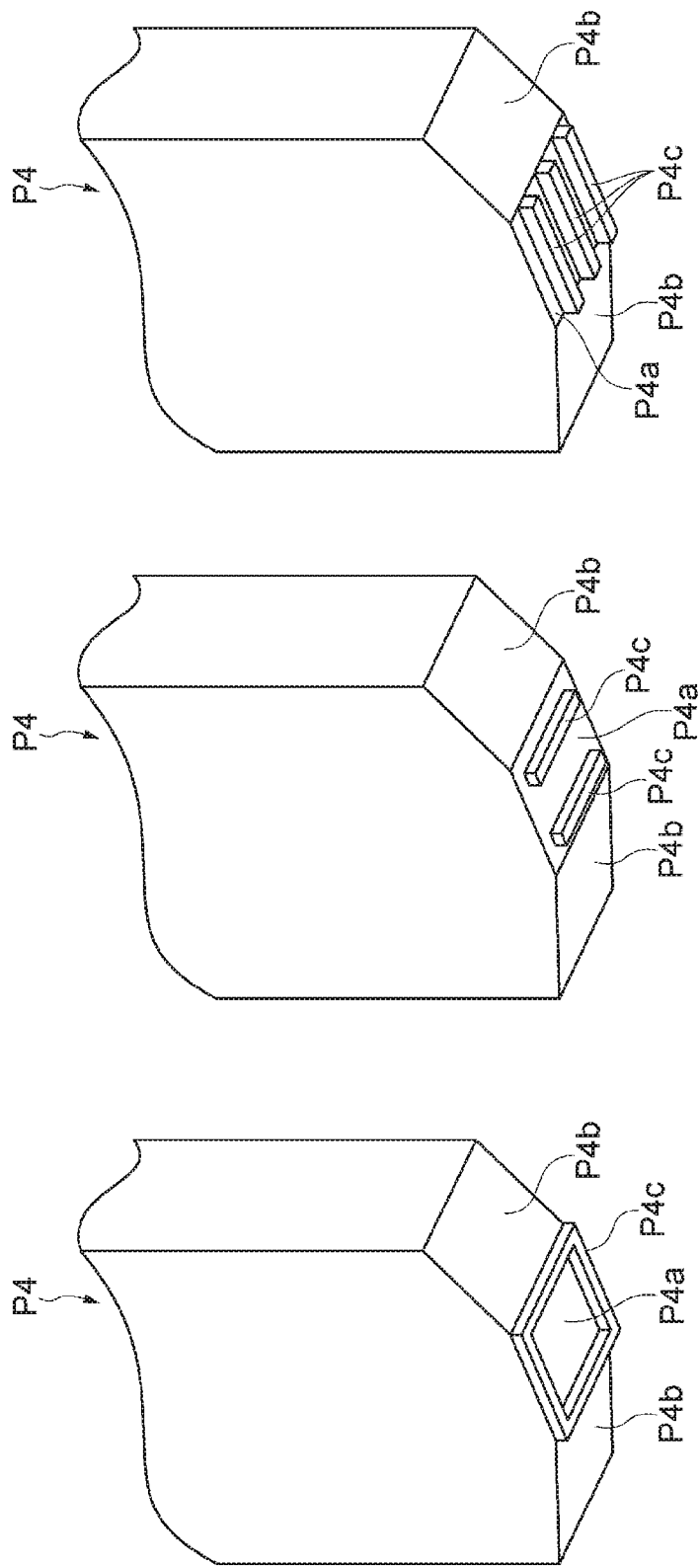

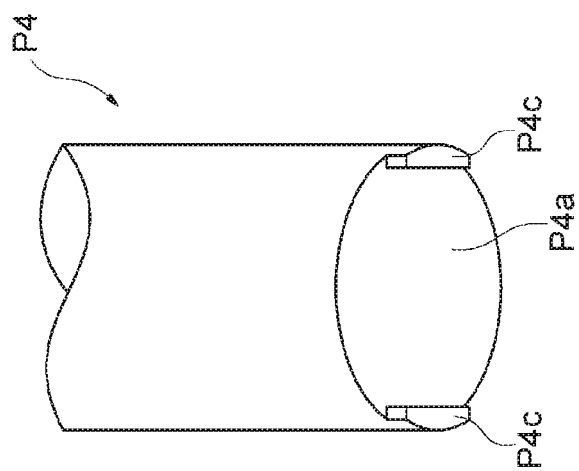
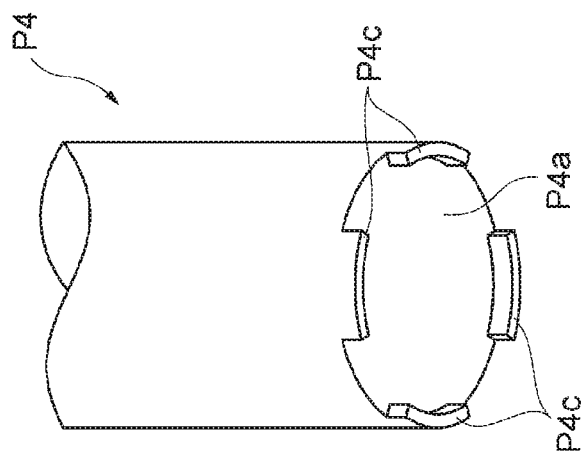
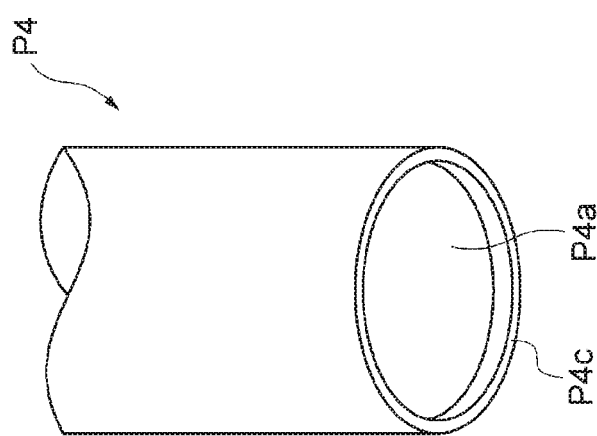

METAL LAMINATE AND MANUFACTURING METHOD OF METAL LAMINATE

CROSS REFERENCE TO RELATED APPLICATION(S)

This application is based upon and claims the benefit of priority of Japanese Patent Application No. 2018-143615 filed on Jul. 31, 2018, the contents of which are incorporated herein by reference in its entirety.

BACKGROUND OF THE INVENTION

1. Field of the Invention

The present disclosure relates to a metal laminate and a metal laminate manufacturing method.

2. Description of the Related Art

JP-A-2007-014122 referred to as Patent Literature 1 discloses a method for manufacturing a laminated iron core. The method includes: intermittently and sequentially feeding, from an uncoiler, a coil material, which is a belt-like metal plate wound in a coil shape (plate to be processed), at a predetermined pitch and forming a through hole or a caulking at a predetermined position of the metal plate; punching the metal plate with a punch to form a punched member including the through hole or the caulking; laminating a plurality of punched members, fastening the plurality of punched members by through hole and caulking to form the laminated iron core.

CITATION LIST

Patent Literature

Patent Literature 1: JP-A-2007-014122

SUMMARY OF THE INVENTION

The present disclosure describes a metal laminate and a metal laminate manufacturing method capable of significantly improving a fastening force of a caulking.

A metal laminate according to an aspect of the present disclosure includes a laminate, in which a first metal plate and a second metal plate are laminated. The first metal plate includes a caulking that exhibits a mountain shape protruding from a back surface side of the first metal plate and recessed on a front surface side of the first metal plate, and the second metal plate includes an accommodating portion configured to accommodate the caulking of the first metal plate such that the caulking is fitted to the accommodating portion. The caulking of the first metal plate includes: a recessed portion provided on an inner concave surface of the caulking and recessed toward the back surface side of the first metal plate; and an abutting portion provided on an outer convex surface of the caulking and abutted against an inner surface of the accommodating portion of the second metal plate at a position corresponding to the recessed portion. The abutting portion of caulking of the first metal plate expands laterally from the outer convex surface toward the inner surface of the accommodating portion of the second metal plate.

A metal laminate according to another aspect of the present disclosure includes a laminate, in which a first metal plate and a second metal plate are laminated. The first metal plate includes a caulking that exhibits a mountain shape protruding from a back surface side of the first metal plate and recessed on a front surface side of the first metal plate, and the second metal plate includes an accommodating portion configured to accommodate the caulking of the first metal plate such that the caulking is fitted to the accommodating portion. The caulking of the first metal plate includes: a recessed portion provided on an inner concave surface of the caulking and recessed toward the back surface side of the first metal plate; and an abutting portion abutted against an inner surface of the accommodating portion of the second metal plate at a position corresponding to the recessed portion. A metal density of the abutting portion of the caulking is higher than a metal density of a remaining portion of the caulking.

A metal laminate manufacturing method according to another aspect of the present disclosure includes providing a first metal plate and a second metal plate, wherein the first metal plate includes a caulking that exhibits a mountain shape protruding from a back surface side of the first metal plate and recessed on a front surface side of the first metal plate, and the second metal plate includes an accommodating portion configured to accommodate the caulking of the first metal plate; and laminating the first metal plate and the second metal plate such that the caulking of the first metal plate is fitted to the accommodating portion of the second metal plate. The laminating of the first and second metal plates includes: pressing a push punch, which is provided with a protrusion on a tip end surface thereof, against an inner concave surface of the caulking of the first metal plate to form a recessed portion in the inner concave surface of the caulking; and forming an abutting portion in the caulking, configured to be abutted against an inner surface of the accommodating portion of the second metal plate at a position corresponding to the recessed portion when the caulking is fitted to the accommodating portion.

According to the metal laminate and the metal laminate manufacturing method of the present disclosure, the fastening force of the caulking can be significantly improved.

BRIEF DESCRIPTION OF THE DRAWINGS

In the accompanying drawings:

FIG. 5 is a cross-sectional view taken along line V-V of FIG. 4A.

FIG. 8 is a cross-sectional view schematically showing a mechanism for laminating a punched member and a mechanism for discharging a laminate from a mold, which describes a situation in which the punched member is punched out from an electromagnetic steel plate by a punch.

FIGS. 11A to 11C are perspective views showing other examples of a push punch when viewed from below, the push punch being configured to form a V-shaped caulking.

FIGS. 13A to 13C are perspective views showing other examples of a push punch when viewed from below, the push punch being configured to form a round flat caulking.

DETAILED DESCRIPTION OF THE EXEMPLARY EMBODIMENTS

Figure 1:
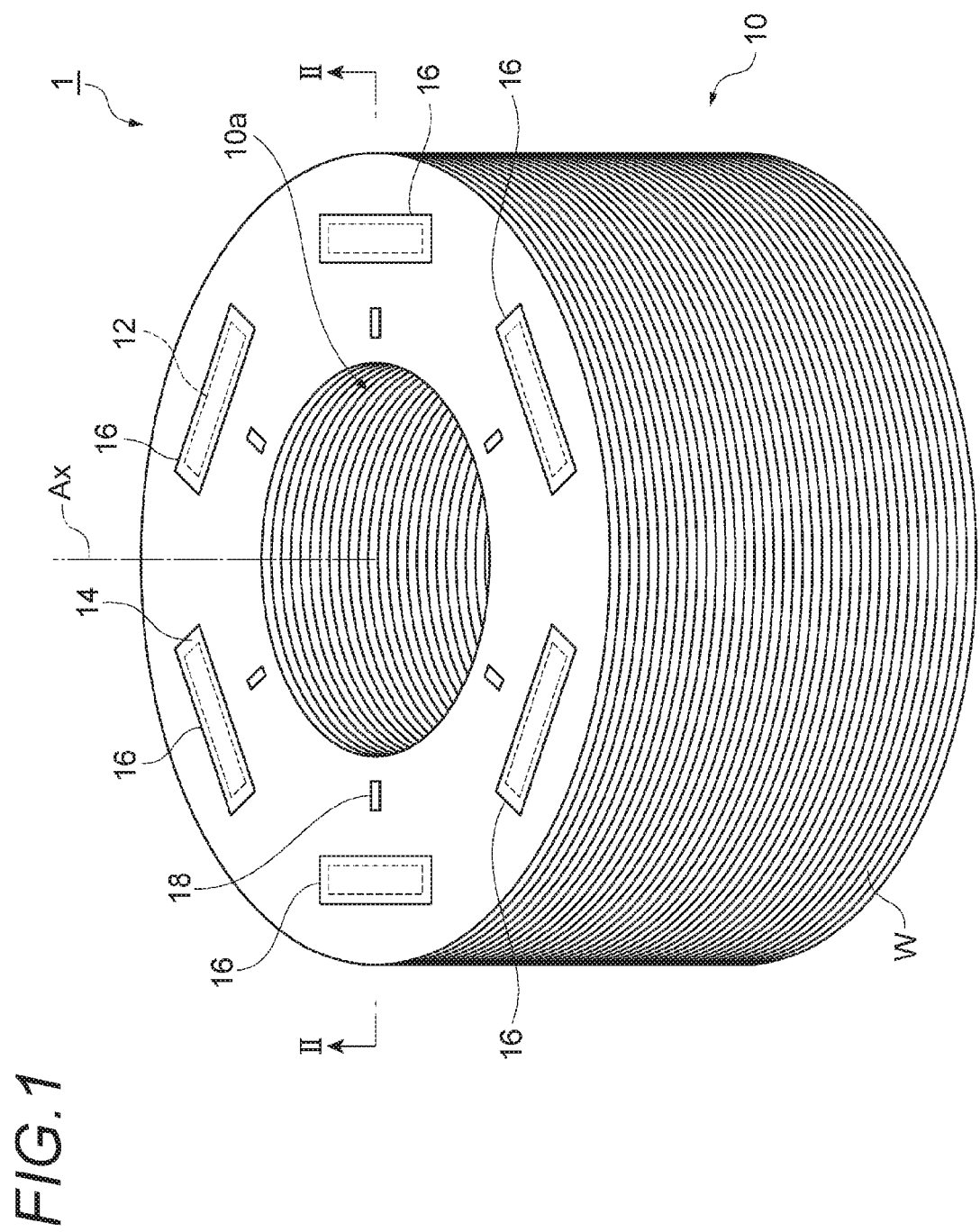
FIG. 1 is a perspective view showing an example of a rotor laminated iron core.

Hereinafter, an example of an embodiment according to the present disclosure will be described in detail with reference to the accompanying drawings. In the following description, the same elements or elements having the same functions will be denoted by the same reference numerals and signs, and a repetitive description thereof will be omitted.

[Rotor Laminated Iron Core]

First, a configuration of a rotor laminated iron core 1 (metal laminate) will be described with reference to FIGS. 1 and 2. The rotor laminated iron core 1 is a part of a rotor. The rotor is formed by attaching an end face plate (not shown) and a shaft to the rotor laminated iron core 1. The rotor is combined with a stator to form a motor. The rotor laminated iron core 1 in the present embodiment may be used in an interior permanent magnet type (IPM) motor or may be used in other types of motors.

As shown in FIG. 1, the rotor laminated iron core 1 includes: a laminate 10; a plurality of permanent magnets 12; and a plurality of solidified resins 14.

The laminate 10 has a cylindrical shape. A shaft hole 10a penetrating the laminate 10 is provided in a central portion of the laminate 10. The shaft hole 10a extends along a central axis Ax. That is, the shaft hole 10a extends in a lamination direction (height direction) of the laminate 10. In the present embodiment, since the laminate 10 rotates around the central axis Ax, the central axis Ax is also a rotation axis. The shaft is inserted into the shaft hole 10a.

A plurality of magnet insertion holes 16 are formed in the laminate 10. As shown in FIG. 1, the magnet insertion holes 16 are arranged at predetermined intervals along an outer peripheral edge of the laminate 10. As shown in FIG. 2, the magnet insertion holes 16 extend along the central axis Ax and penetrate the laminate 10. That is, the magnet insertion holes 16 extend in the height direction.

In the present embodiment, shapes of the magnet insertion holes 16 are long holes extending along the outer peripheral edge of the laminate 10. In the present embodiment, the number of the magnet insertion holes 16 is six. The magnet insertion holes 16 are arranged clockwise when viewed from above. The positions, shapes, and number of the magnet insertion holes 16 may be changed according to use, required performance, and the like of the motor.

The laminate 10 is configured by laminating a plurality of punched members W. The punched members W are plate-like bodies formed by punching electromagnetic steel plates ES (metal material) described below into predetermined shapes, and have shapes corresponding to the laminate 10. As shown in FIG. 2, the punched members W constituting portions other than a lowermost layer of the laminate 10 are referred to as "punched members W1" (first metal plates), and the punched members W constituting the lowermost layer of the laminate 10 are referred to as "punched members W2" (second metal plates).

The laminate 10 may be configured by so-called rolling lamination or skewing. The term "rolling lamination" refers to relatively staggering angles between the punched members W and laminating a plurality of punched members W. The rolling lamination is mainly performed to counterbalance plate thickness deviation of the laminate 10. The term "skewing" refers to laminating a plurality of punched members W in a manner in which the punched members W have twist angles with respect to the central axis Ax. The skewing is performed to reduce cogging torque, torque ripples, and the like. The angles of the rolling lamination or the skewing may be set to any size.

Figure 2:
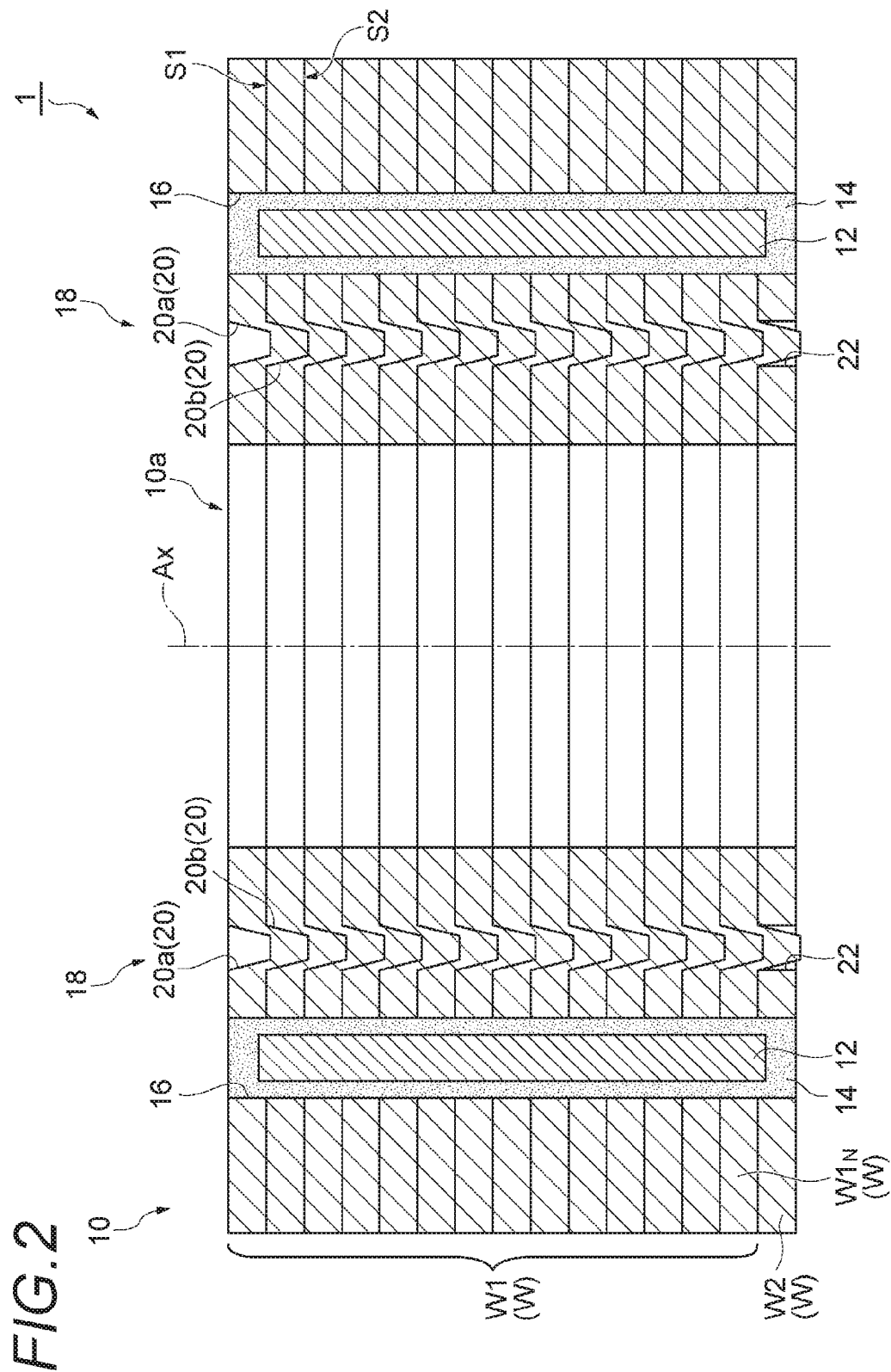
FIG. 2 is a cross-sectional view taken along line II-II of FIG. 1.

As shown in FIGS. 1 and 2, the punched members W adjacent to each other in the lamination direction are fastened by a caulking portion 18. Specifically, as shown in FIG. 2, the caulking portion 18 includes caulkings 20 formed on the punched members W1 and through holes 22 formed in the punched members W2.

Each caulking 20 includes: a recess 20a formed on a front surface S1 side of the punched member W1; and a protrusion 20b formed on a back surface S2 side of the punched member W1. The caulking 20 has a mountain shape as a whole, for example. The caulking 20 having such a shape is also referred to as a "V-shaped caulking". A length of the caulking 20 may be, for example, about 4 mm. A width of the caulking 20 may be, for example, about 1 mm.

The recess 20a of one punched member W1 is fitted to the protrusion 20b of another punched member W1 adjacent to the front surface S1 side of the one punched member W1. The protrusion 20b of the one punched member W1 is joined to the recess 20a of another punched member W1 adjacent to the back surface S2 side of the one punched member W1. That is, the recess 20a of the other punched member functions as an accommodating portion that accommodates the protrusion 20b of the one punched member W1.

The through hole 22 is a long hole having a shape corresponding to an outer shape of the caulking 20. When the caulking 20 is the V-shaped caulking, the through hole 22 has a rectangular shape. The protrusion 20b of a punched member W1N adjacent to the punched member W2 is fitted into the through hole 22. That is, the through hole 22 functions as an accommodating portion that accommodates the protrusion 20b of the punched member W1N. When the laminates 10 are continuously manufactured, the through hole 22 has a function of preventing the punched member W formed later from being fastened to the laminate 10 manufactured earlier by the caulking 20 (the protrusion 20b).

As shown in FIG. 2, a tip portion of the protrusion 20b of the caulking 20 protrudes outward from the through hole 22. That is, in a state where a lower end surface of the laminate 10 faces downward, a bottom portion of the protrusion 20b of the caulking 20 protrudes downward from the lower end surface. A protrusion amount of the caulking 20 from the back surface S2 may be larger than a plate thickness of the punched member W1, for example, about 0.25 mm to 0.5 mm, or about 0.28 mm.

As shown in FIGS. 1 and 2, one permanent magnet 12 is inserted into each magnet insertion hole 16. A shape of the permanent magnet 12 is not particularly limited, and the permanent magnet 12 has a rectangular parallelepiped shape in the present embodiment. A type of the permanent magnet 12 may be determined according to the use, the required performance, and the like, of the motor, and may be, for example, a sintered magnet or a bonded magnet.

The solidified resin 14 is obtained by filling a molten resin material (molten resin) into the magnet insertion hole 16 after the permanent magnet 12 is inserted and then solidifying the molten resin. The solidified resin 14 has a function of fixing the permanent magnet 12 in the magnet insertion hole 16 and a function of joining the adjacent punched members W in the lamination direction (up-down direction). Examples of the resin material constituting the solidified resin 14 include thermosetting resin and thermoplastic resin. A specific example of the thermosetting resin includes a resin composition including an epoxy resin, a curing initiator, and an additive. Examples of the additive include a filler, a flame retardant, and a stress reducing agent.

[Details of Caulking]

Figure 3:
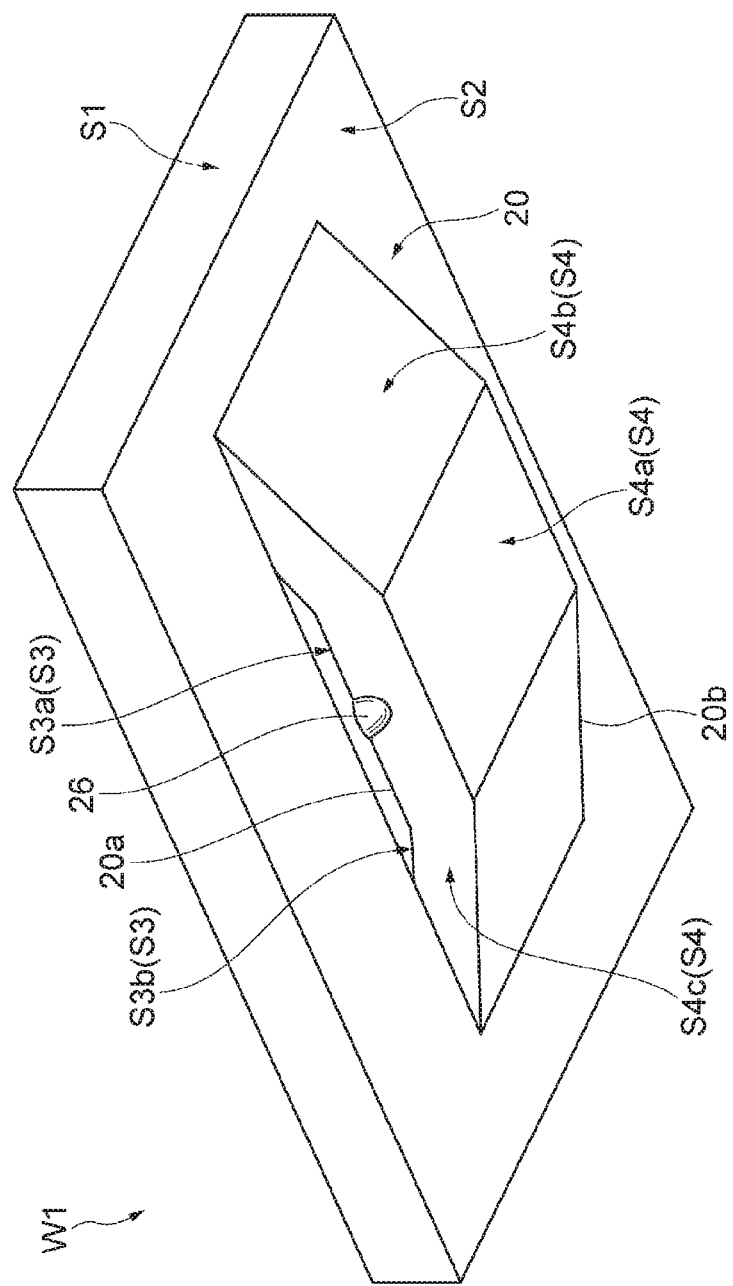
FIG. 3 is a perspective view showing an example of a caulking when viewed from below.

Next, a configuration of the caulking 20 will be described in detail with reference to FIGS. 3 to 5.

Figure 4A:
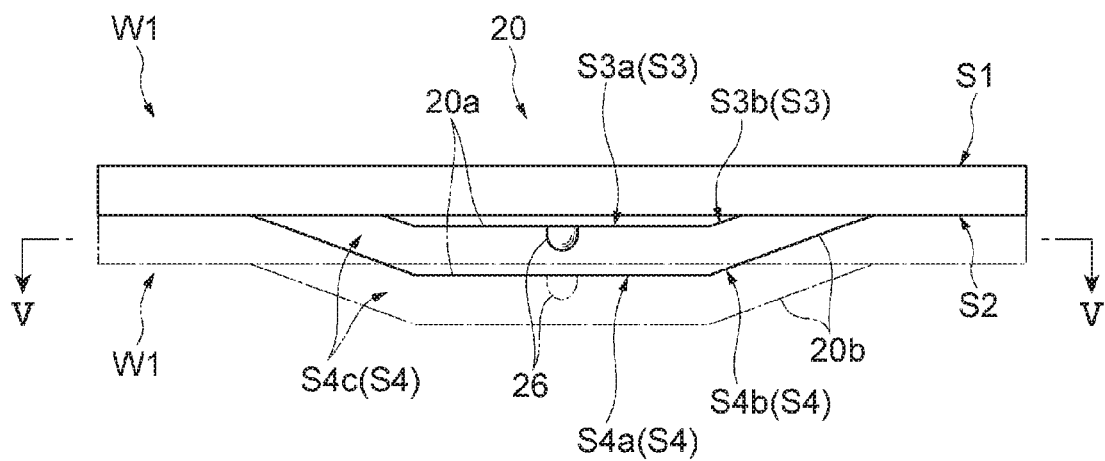
FIG. 4A is a side view showing the example of the caulking.
Figure 4B:
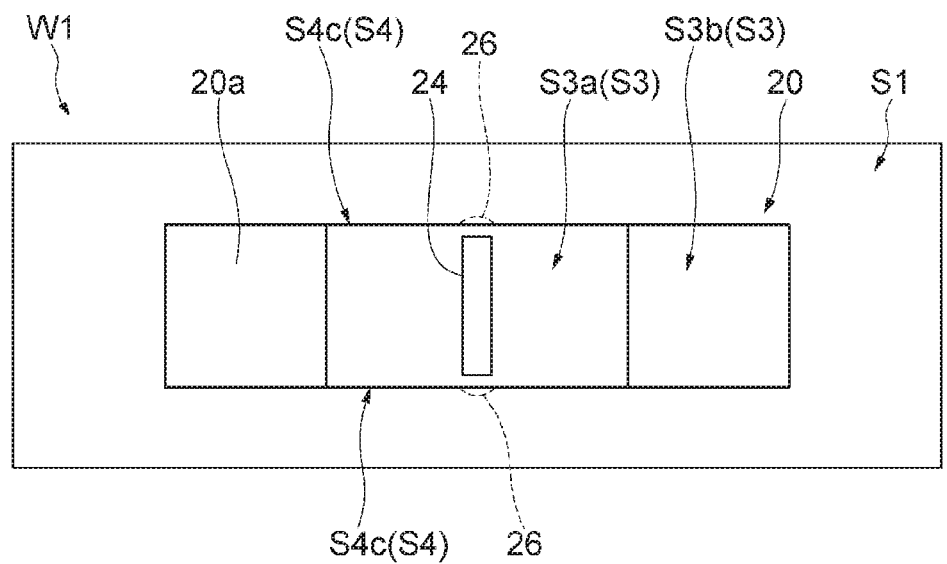
FIG. 4B is a top view showing the example of the caulking.

A front surface of the recess 20a of the caulking 20 constitutes an inner concave surface S3 of the caulking 20. As shown in FIGS. 3 4A and 4B, the inner concave surface S3 includes a bottom surface S3a and a side surface S3b rising from the bottom surface S3a. In the embodiment exemplified in FIG. 3 and FIGS. 4A and 4B, a pair of side surfaces S3b are disposed on two sides of the bottom surface S3a in a longitudinal direction of the caulking 20, and the pair of side surfaces S3b are inclined surfaces inclined so as to be separated from each other as extending upward from the bottom surface S3a.

As shown in FIGS. 4B and 5, the bottom surface S3a is provided with a recessed portion 24 recessed toward the back surface S2 side. That is, the caulking 20 includes the recessed portion 24 provided in the inner concave surface S3. The recessed portion 24 linearly extends in a short direction (width direction) of the caulking 20. A length of the recessed portion 24 may be smaller than the width of the caulking 20. In this case, an end portion of the recessed portion 24 does not reach an abutting portion 26 described below (see FIGS. 4B and 5). That is, a separation distance d1 between the end portion of the recessed portion 24 and a side edge of the bottom surface S3a may be greater than 0, and may be about 10 μm to 200 μm. A width d2 of the recessed portion 24 may be, for example, about 10 μm to 50 μm. A depth of the recessed portion 24 may be, for example, ½ or less of the plate thickness of the punched member W1. The depth of the recessed portion 24 is not necessarily constant in the longitudinal direction. That is, a shape of the recessed portion 24 does not necessarily correspond to a top portion P4a of a push punch P4 described below.

A front surface of the protrusion 20b of the caulking 20 forms an outer convex surface S4 of the caulking 20. As shown in FIGS. 3 and 4A, the outer convex surface S4 includes a bottom surface S4a and side surfaces S4b, S4c rising from the bottom surface S4a. In the embodiment exemplified in FIG. 3 and FIGS. 4A and 4B, a pair of side surfaces S4b are disposed on two sides of the bottom surface S4a in a longitudinal direction of the caulking 20, and the pair of side surfaces S4b are inclined surfaces inclined so as to be separated from each other as extending upward from the bottom surface S4a. In the embodiment exemplified in FIG. 3 and FIGS. 4A and 4B, a pair of side surfaces S4c is disposed on the two sides of the bottom surface S4a in a short direction (width direction) of the caulking 20. Each side surface S4c extends so as to connect the bottom surface S4a, the side surface S4b, and the inner concave surface S3.

The side surface S4c is provided with the abutting portion 26 that expands laterally outward from the side surface S4c. That is, the caulking 20 includes the abutting portion 26 provided on the outer convex surface S4. The abutting portion 26 is positioned in a manner that corresponds to the recessed portion 24. In the example shown in FIGS. 4B and 5, the abutting portion 26 is positioned in the vicinity of the end portion of the recessed portion 24. As shown in FIGS. 4A, 4B and 5, the abutting portion 26 abuts against an inner surface of the recess 20a of the other caulking 20 accommodating the protrusion 20b of the caulking 20, or against an inner surface of the through hole 22 accommodating the protrusion 20b of the caulking 20. Hereinafter, the recess 20a and the through hole 22 may be collectively referred to as "accommodating portions".

As shown in FIG. 5, a width d3 of the abutting portion 26 may be larger than the width d2 of the recessed portion 24, and may be, for example, about 20 μm to 60 μm. A protrusion amount of the abutting portion 26 may be, for example, about 0 μm to 20 μm. A metal density of the abutting portion 26 may be higher than metal densities of other portions of the caulking 20. These metal densities can be confirmed by, for example, cross-sectional observation using a scanning electron microscope (SEM).

[Rotor Laminated Iron Core Manufacturing Apparatus]

Next, a manufacturing apparatus 100 of the rotor laminated iron core 1 will be described with reference to FIGS. 6 to 10.

Figure 6:
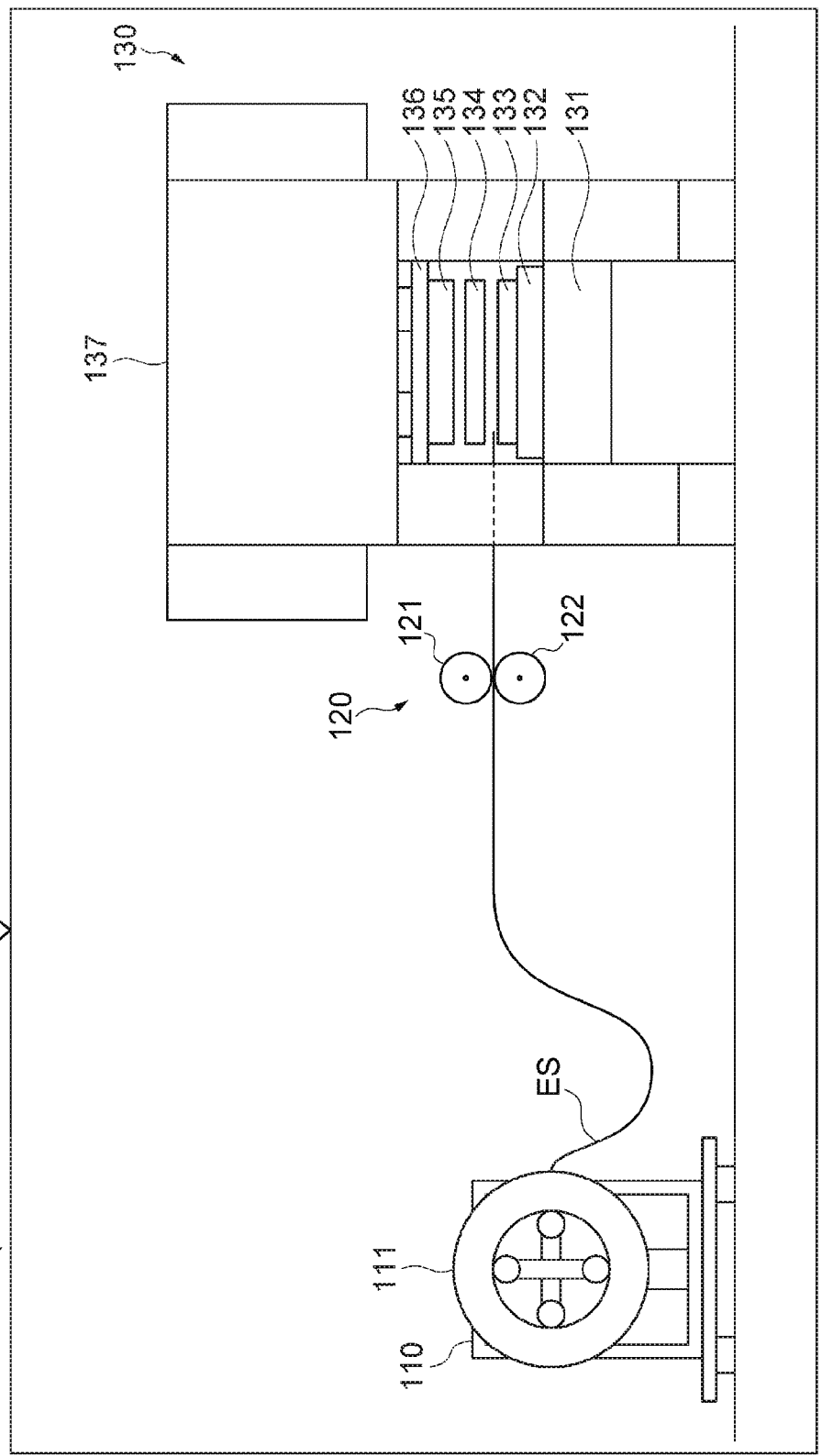
FIG. 6 is a schematic view showing an example of a rotor laminated iron core manufacturing apparatus.

As shown in FIG. 6, the manufacturing apparatus 100 is a device for manufacturing the rotor laminated iron core 1 from an electromagnetic steel plate ES (a plate to be processed) which is a belt-like metal plate. A thickness of the electromagnetic steel plate ES may be, for example, about 0.1 mm to 0.5 mm, or may be about 0.25 mm. The manufacturing apparatus 100 includes an uncoiler 110, a feeding device 120, a punching device 130, a magnet attachment device (not shown), and a controller 140 (control unit).

The uncoiler 110 rotatably holds a coil material 111 in a state where the coil material 111 is mounted, the coil material 111 being a belt-like electromagnetic steel plate ES wound in a coil shape. The feeding device 120 includes a pair of rollers 121, 122 sandwiching the electromagnetic steel plate ES from an upper side and a lower side. The pair of rollers 121 and 122 rotate and stop based on an instruction signal from the controller 140, and intermittently and sequentially feed the electromagnetic steel plate ES toward the punching device 130.

The punching device 130 operates based on the instruction signal from the controller 140. The punching device 130 has a function of sequentially punching, by a plurality of punches, the electromagnetic steel plate ES intermittently fed by the feeding device 120 to form the punched member W, and a function of sequentially laminating the punched members W obtained by the punching, so as to manufacture the laminate 10.

The punching device 130 includes a base 131, a lower die 132, a die plate 133, a stripper 134, an upper die 135, a top plate 136, a pressing machine 137 (a drive unit), and a plurality of punches.

The base 131 is installed on a floor surface, and supports the lower die 132 placed on the base 131. The lower die 132 holds the die plate 133 placed on the lower die 132. The lower die 132 is provided with a discharge hole at a predetermined position through which a material (for example, the punched member W, waste material, or the like) punched out from the electromagnetic steel plate ES is discharged.

The die plate 133 has a function of forming the punched member W together with the plurality of punches. The die plate 133 is provided with dies at positions corresponding to each punch. Each die is provided with a die hole through which a corresponding punch can be inserted.

The stripper 134 has a function of sandwiching the electromagnetic steel plate ES with the die plate 133 when the electromagnetic steel plate ES is punched by each punch, and a function of removing the electromagnetic steel plate ES clamped by each punch from each punch. The upper die 135 is positioned above the stripper 134. Base end portions of each punch are attached to the upper die 135.

The top plate 136 holds the upper die 135 from above the upper die 135. The pressing machine 137 is positioned above the top plate 136. A piston of the pressing machine 137 is connected to the top plate 136 and operates based on the instruction signal from the controller 140. When the pressing machine 137 operates, the piston expands and contracts, and the stripper 134, the upper die 135, the top plate 136, and each punch move up and down as a whole.

The magnet attachment device operates based on the instruction signal from the controller 140. The magnet attachment device has a function of inserting the permanent magnet 12 into each magnet insertion hole 16 of the laminate 10 obtained by the punching device 130, and a function of filling the molten resin into the magnet insertion hole 16 through which the permanent magnet 12 is inserted.

The controller 140 generates the instruction signal for operating the feeding device 120, the punching device 130, and the magnet attachment device based on, for example, a program recorded in a recording medium (not shown) or operation input from an operator, and transmits the instruction signal to the feeding device 120, the punching device 130, and the magnet attachment device, respectively.

Figure 7A:
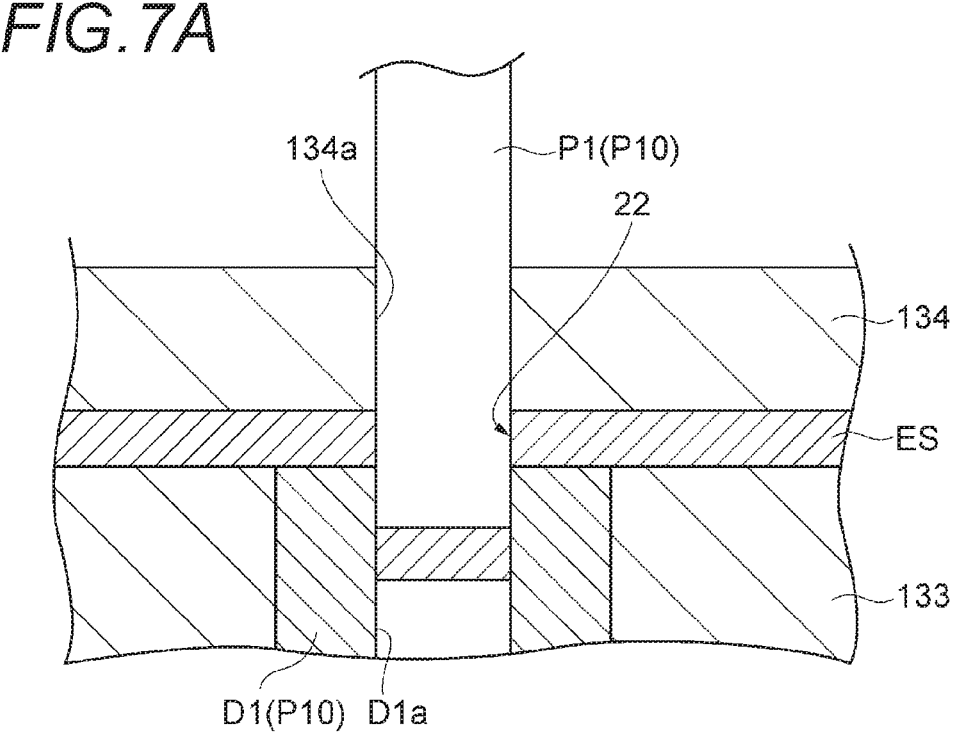
FIG. 7A is a schematic cross-sectional view for describing a process of forming a through hole.
Figure 7B:
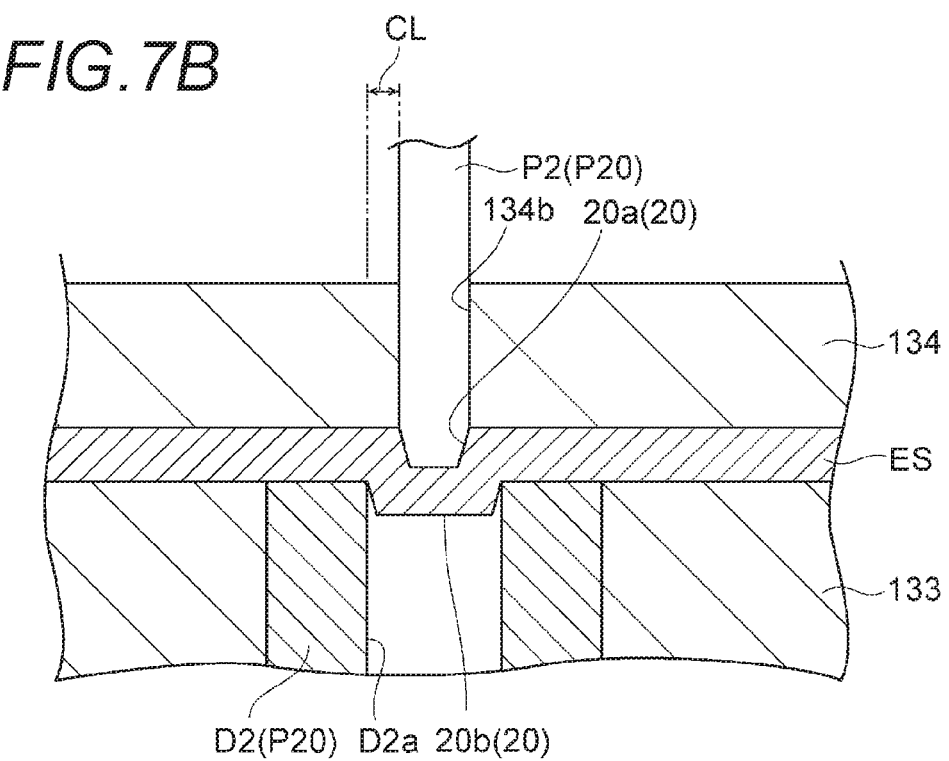
FIG. 7B is a schematic cross-sectional view for describing a process of forming a caulking.

Here, the plurality of punches and the plurality of dies included in the punching device 130 will be described in detail. For example, as shown in FIGS. 7A, 7B and 8, the punching device 130 includes punch portions P10, P20 and P30.

The punch portion P10 has a function of forming the through hole 22 in the electromagnetic steel plate ES serving as the punched member W2. As shown in FIG. 7A, the punch portion P10 is configured by a combination of a die D1 and a punch P1 (second punch). A die hole D1a is formed in the die D1.

The punch P1 has a shape corresponding to the die hole D1a. The punch P1 can be inserted into and removed from the die hole D a through a through hole 134a of the stripper 134.

The punch portion P20 has a function of forming the caulking 20 on the electromagnetic steel plate ES serving as the punched member W1. As shown in FIG. 7B, the punch portion P20 is configured by a combination of a die D2 and a punch P2 (first punch). A die hole D2a is formed in the die D2. A size of the die hole D2a may be the same as a size of the die hole D1a.

The punch P2 has a shape corresponding to the die hole D2a. The punch P2 can be inserted into and removed from the die hole D2a through a through hole 134b of the stripper 134. An outer shape of the punch P2 is set to be slightly smaller than an outer shape of the die hole D2a. A clearance CL between the die hole D2a and the punch P2 can be set to various sizes according to a fitting force generated between the caulking 20 and the through hole 22.

A tip end portion of the punch P2 has a mountain shape as a whole. Therefore, shape unevenness corresponding to the tip end portion of the punch P2 is formed on the electromagnetic steel plate ES processed by the punch P2. The unevenness forms the caulking 20.

The punch portion P30 has a function of punching the electromagnetic steel plate ES to form the punched member W. As shown in FIG. 8, the punch portion P30 is configured by a combination of a die D3, a punch P3 (third punch), and the push punch P4. A die hole D3a is formed in the die D3. The die hole D3a has a shape corresponding to an outer shape of the punched member W.

The punch P3 has a shape corresponding to the die hole D3a. The punch P3 can be inserted into and removed from the die hole D3a through a through hole 134c of the stripper 134. The punch P3 includes a plurality of through holes P3a extending in a longitudinal direction thereof. Each of the plurality of through holes P3a is positioned in a manner that corresponds to the plurality of caulkings 20 formed on the electromagnetic steel plate ES by the punch P2.

One push punch P4 is inserted into each of the through holes P3a. The push punch P4 can move up and down in the through hole P3a, and can adjust a protrusion amount of the punch P3 protruding from the lower end surface. However, when the electromagnetic steel plate ES is punched by the punch P3, the push punch P4 is fixed with respect to the punch P3.

Figure 9:
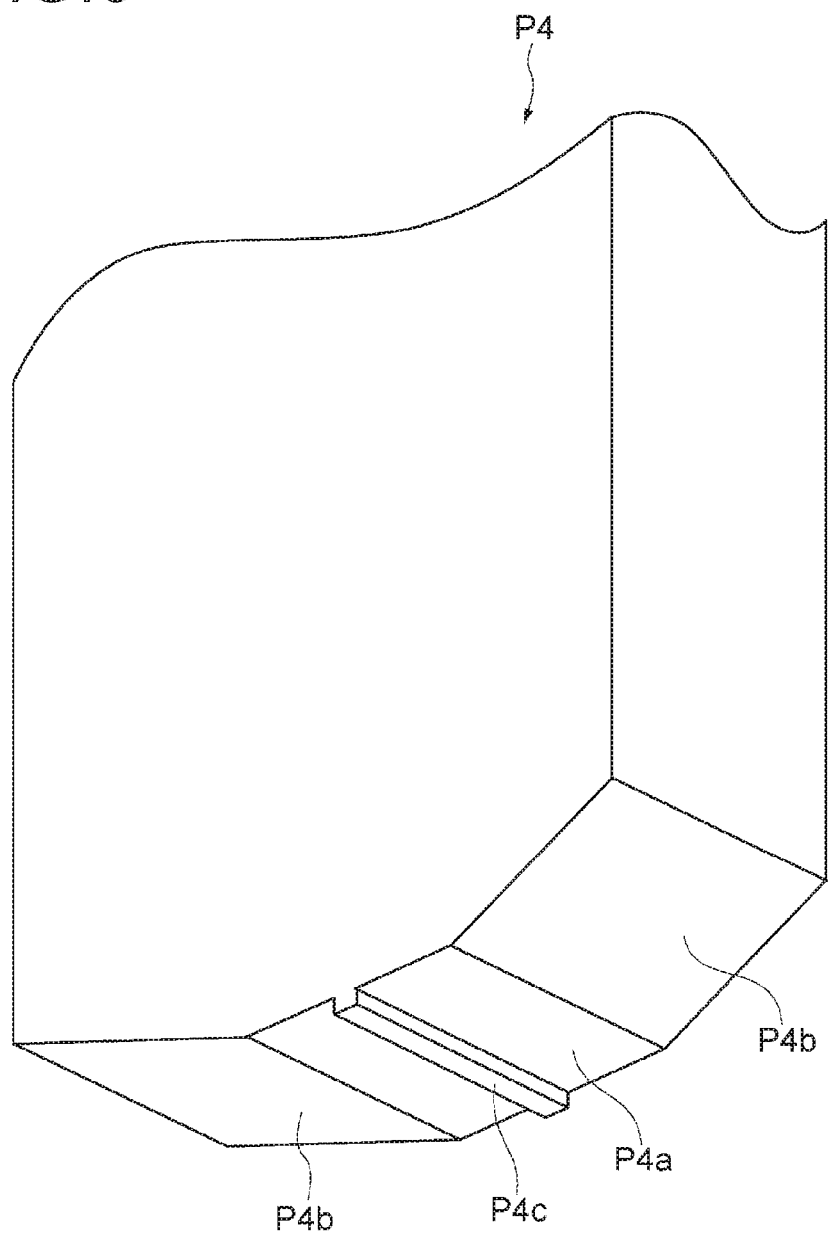
FIG. 9 is a perspective view showing an example of a push punch when viewed from below.

As shown in FIG. 9, the push punch P4 has a rectangular parallelepiped shape corresponding to the recess 20a of the caulking 20. A lower end portion of the push punch P4 has a mountain shape as a whole. More specifically, the lower end portion includes the top portion P4a (tip end surface), skirt portions P4b positioned on two sides of the top portion P4a, and a protruding portion P4c (protrusion) protruding downward from the top portion P4a In the example shown in FIG. 9, the protruding portion P4c is a protruding bar extending in a direction (thickness direction of the push punch P4) orthogonal to a direction in which the top portion P4a and the skirt portions P4b are arranged (width direction of the push punch P4).

Figure 10:
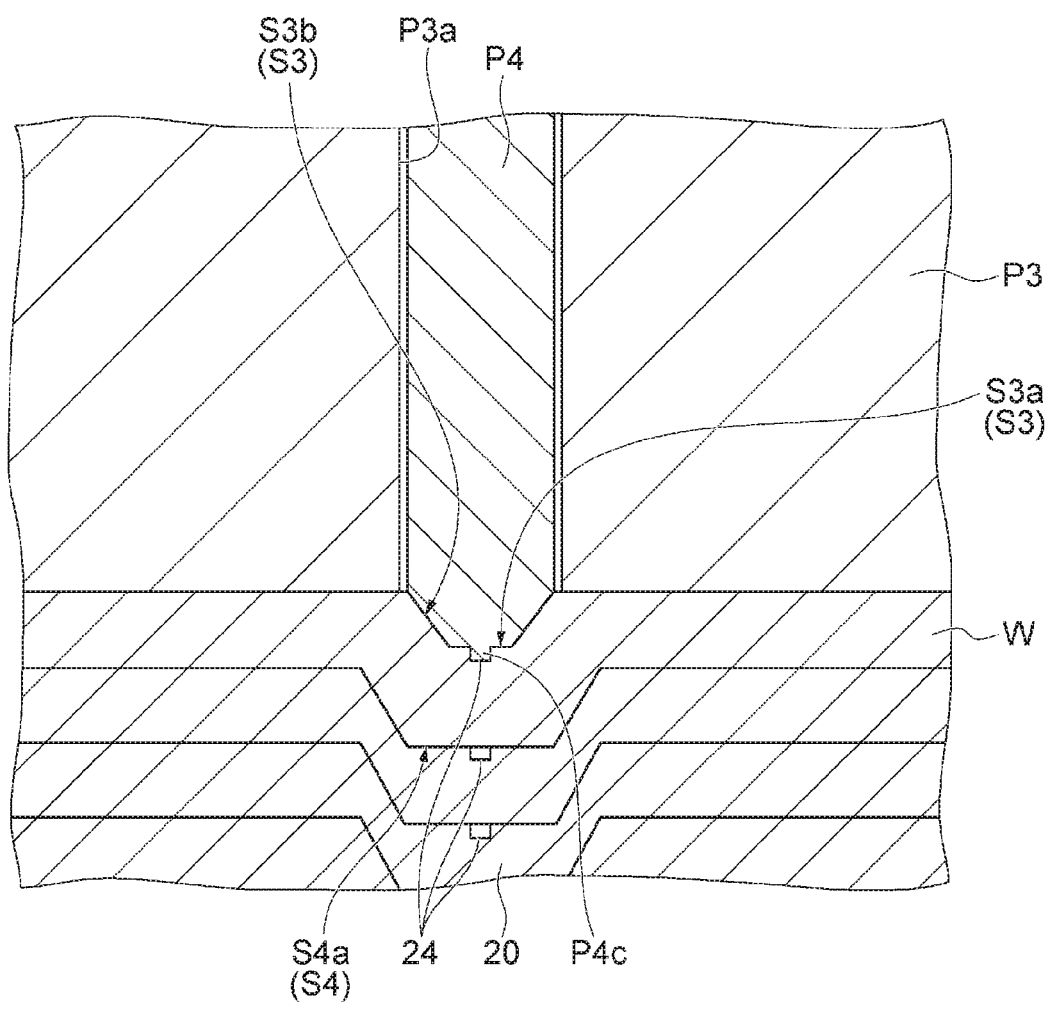
FIG. 10 is an enlarged cross-sectional view of the push punch of FIG. 9.

The push punch P4 has a function of moving up and down integrally with the punch P3, when the electromagnetic steel plate ES is punched by the punch P3, so as to press the recess 20a of the caulking 20. When the lower end portion of the push punch P4 is pressed against the recess 20a, as shown in FIG. 10, the top portion P4a presses the bottom surface S3a of the recess 20a, the skirt portions P4b press the side surfaces S3b of the recess 20a, and the protruding portion P4c forms the recessed portion 24 on the bottom surface S3a.

Referring back to FIG. 8, a cylinder 132b, a stage 132c, and a pusher 132d are disposed in a space 132a below the die D3. The cylinder 132b is movable in the up-down direction through a hole 132e provided in the stage 132c based on the instruction signal from the controller 140. Specifically, the cylinder 132b intermittently moves downward each time the punched member W is laminated on the cylinder 132b. When a predetermined number of punched members W are laminated on the cylinder 132b, the laminate 10 is formed, and the cylinder 132b moves to a position where a front surface of the cylinder 132b is flush with a front surface of the stage 132c.

At this time, the protrusion 20b of the punched member WIN adjacent to the punched member W2 protrudes downward from the lower end surface of the laminate 10 through the through hole 22. That is, the bottom surface S4a of the protrusion 20b of the punched member W1N adjacent to the punched member W2 is supported by the front surface (support surface) of the cylinder 132b.

The pusher 132d is movable in a horizontal direction on the front surface of the stage 132c based on the instruction signal from the controller 140. When the cylinder 132b is moved to a position where the front surface of the cylinder 132b is flush with the front surface of the stage 132c, the pusher 132d puts out the laminate 10 from the cylinder 132b to the stage 132c. The laminate 10 put out to the stage 132c is conveyed to the subsequent magnet attachment device by a conveyor or human hands.

[Rotor Laminated Iron Core Manufacturing Method]

Next, a method for manufacturing the rotor laminated iron core 1 will be described with reference to FIGS. 6 to 10.

First, the electromagnetic steel plate ES is sequentially punched by the punching device 130 while the punched members W are laminated to form the laminate 10. Specifically, as shown in FIG. 6, the electromagnetic steel plate ES is fed to the punching device 130 by the feeding device 120, a processing target portion of the electromagnetic steel plate ES reaches a predetermined punch, a through hole is formed in accordance with the shaft hole 10a (so-called inner diameter punching), the caulking 20 or the through hole 22 is formed, and the punched member W is punched out from the electromagnetic steel plate ES.

The caulking 20 and the through hole 22 are selectively formed. That is, the caulking 20 is formed in a predetermined region where the punched member W1 is to be formed in the electromagnetic steel plate ES, and the through hole 22 is formed in a predetermined region where the punched member W2 is to be formed in the electromagnetic steel plate ES.

The through hole 22 is formed as follows. That is, as shown in FIG. 7A, the punching device 130 operates based on the instruction signal from the controller 140, the electromagnetic steel plate ES is sandwiched by the die plate 133 and the stripper 134. Subsequently, the punch P1 moves down through the through hole 134a of the stripper 134, and a tip end portion of the punch P1 pushes the electromagnetic steel plate ES into the die hole D1a. Accordingly, the through hole 22 is formed in the electromagnetic steel plate ES.

The caulking 20 is formed as follows. That is, as shown in FIG. 7B, the punching device 130 operates based on the instruction signal from the controller 140, the electromagnetic steel plate ES is sandwiched by the die plate 133 and the stripper 134. Subsequently, the punch P2 moves down through the through hole 134b of the stripper 134, and the tip end portion of the punch P2 pushes the electromagnetic steel plate ES into the die hole D2a. Accordingly, the caulking 20 is formed on the electromagnetic steel plate ES.

The punching of the punched member W punched out from the electromagnetic steel plate ES is performed as follows. That is, as shown in FIGS. 8 to 10, the punching device 130 operates based on the instruction signal from the controller 140, the electromagnetic steel plate ES is sandwiched by the die plate 133 and the stripper 134. Subsequently, the punch P3 and the push punch P4 move down through the through hole 134c of the stripper 134, and a tip end portion of the punch P3 pushes the electromagnetic steel plate ES into the die hole D3a. Accordingly, the punched member W is punched out from the electromagnetic steel plate ES.

When the punched member W2 is punched out from the electromagnetic steel plate ES by the punch P3, since the push punch P4 is inserted into the through hole 22, the push punch P4 does not contact the electromagnetic steel plate ES. Meanwhile, when the punched member W1 is punched out from the electromagnetic steel plate ES by the punch P3, the push punch P4 presses the recess 20a of the caulking 20, and the tip end portion of the punch P3 pushes the electromagnetic steel plate ES into the die hole D3a. Accordingly, on the cylinder 132b, the protrusion 20b of the caulking 20 is pressed into the recess 20a of the caulking 20 or the through hole 22, and these two members are fitted to each other.

At this time, the protruding portion P4c of the push punch P4 penetrates the bottom surface S3a of the recess 20a, pushes and spreads metal constituting the electromagnetic steel plate ES to surrounding regions and forms the recessed portion 24 on the bottom surface S3a. Accordingly, the abutting portion 26, which expands laterally outward from the side surface S4c, is formed at a position corresponding to the recessed portion 24. The laterally expanded abutting portion 26 abuts against an inner surface of the accommodating portion and pressurizes the inner surface. In this process, the metal density of the abutting portion 26 becomes higher than the metal densities of the other portions of the caulking 20 (metal density of the caulking 20 before the pressing of the push punch P4).

The punched members W, punched out from the electromagnetic steel plate ES by the punch P3, are laminated on the cylinder 132b to form the laminate 10. The laminate 10 is put out from the cylinder 131b to the stage 132c by the pusher 132d, and is further conveyed to the magnet attachment device by a conveyor or human hands. Thereafter, in the magnet attachment device, the permanent magnet 12 and the molten resin are filled in the magnet insertion hole 16 of the laminate 10, and the permanent magnet 12 is fixed in the magnet insertion hole 16 by the solidified resin 14. Accordingly, the rotor laminated iron core 1 is completed.

[Function]

In the embodiment described above, since the laterally expanding abutting portion 26 abuts against the inner surface of the accommodating portion, contact pressure is increased between the caulking 20 and the accommodating portion. That is, a frictional force acting between the abutting portion 26 and the inner surface of the accommodating portion increases. Therefore, a fastening force of the caulking 20 can be significantly improved. As a result, even if a stress is applied in a direction in which the punched member W1 and the punched member W2 are separated from each other, the punched member W1 is difficult to be peeled off with respect to the punched member W2.

In the above embodiment, the metal density of the abutting portion 26 can be higher than the metal densities of the other portions (a remaining portion) of the caulking 20. It is considered that the metal density of the abutting portion 26 is higher than the other portions as a result of a reaction force from the accommodating portion acting on the abutting portion 26 abutting against the accommodating portion. That is, a larger contact pressure acts between the abutting portion 26 and the accommodating portion. Therefore, the fastening force of the caulking 20 can be further improved.

In the above embodiment, the end portion of the recessed portion 24 extends toward the abutting portion 26 without reaching the abutting portion 26. Therefore, a contact area between the abutting portion 26 and the inner surface of the accommodating portion increases, as compared with a case where the end portion of the recessed portion 24 reaches the abutting portion 26 (a case where the end portion of the recessed portion 24 reaches the side edge of the bottom surface S3a). Therefore, the fastening force of the caulking 20 can be further improved.

In the above embodiment, the recessed portion 24 is provided on the bottom surface S3a. Therefore, metal material pushed aside from the recessed portion 24 moves sideways easily as the abutting portion 26. Therefore, the abutting portion 26 abuts against the inner surface of the accommodating portion more easily.

In the above embodiment, the width d3 of the abutting portion 26 can be larger than the width d2 of the recessed portion 24. In this case, the contact area between the abutting portion 26 and the inner surface of the accommodating portion increases. Therefore, the fastening force of the caulking 20 can be further improved.

In the above embodiment, after the punched member W2 including the through hole 22 is punched out from the electromagnetic steel plate ES, the punched member W1 including the caulking 20 is punched out from the electromagnetic steel plate ES, and the caulking 20 is fitted to the accommodating portion using the push punch P4 at a timing of punching the punched member W1. Therefore, punching the punched member W1 and forming the abutting portion 26 by the push punch P4 can be performed at the same timing or at close timings.

In the above embodiment, the bottom surface S4a of the protrusion 20b of the punched member WIN adjacent to the punched member W2 is supported by the front surface (support surface) of the cylinder 132b. Therefore, metal material pushed aside by the protruding portion P4c of the top portion P4a of the push punch P4 is easy to move laterally from the outer convex surface S4 of the caulking 20 (side surface S4c) toward the inner surface of the accommodating portion, instead of moving from the bottom surface S4a of the outer convex surface S4. Therefore, the abutting portion 26 abuts against the inner surface of the accommodating portion more easily.

[Modification]

Although the embodiment according to the present disclosure is described in detail, various modifications may be made to the above-described embodiment without departing from the scope of the claims or its relevance.

(1) Although in the above embodiment, the protruding portion P4c of the push punch P4 is one protrusion bar linearly extending in the thickness direction of the push punch P4, the protruding portion may have another form. For example, as shown in FIG. 11A, the protruding portion P4c may be a protrusion bar extending in a surrounding shape (rectangular surrounding shape) along an edge of the top portion P4a (tip end surface). As shown in FIG. 11B, the protruding portion P4c may be two or more protrusion bars extending linearly in the thickness direction of the push punch P4. As shown in FIG. 11C, the protruding portion P4c may be one or a plurality of protrusion bars extending linearly along the width direction of the push punch P4.

Figure 12A:
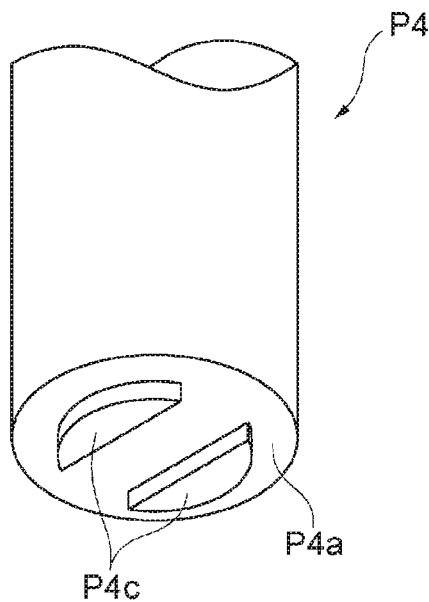
FIG. 12A is a perspective view showing another example of the push punch when viewed from below.
Figure 12B:
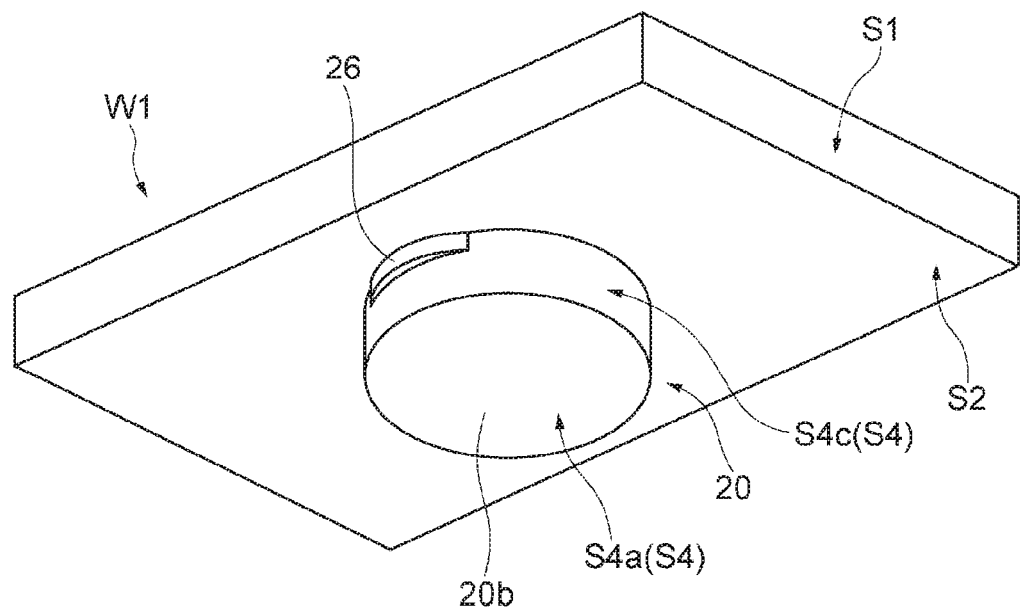
FIG. 12B is a perspective view showing an example of a round flat caulking when viewed from below.

(2) Although the above embodiment exemplifies a case where the caulking 20 is the V-shaped caulking, a type of the caulking 20 is not particularly limited. For example, as shown in FIGS. 12A and 12B, the caulking 20 may be a round flat caulking. In this case, as shown in FIG. 12A, the top portion P4a of the push punch P4 may be provided with a pair of protruding portions P4c having semi cylindrical shapes. When the caulking 20 is pressed by the push punch P4, as shown in FIG. 12B, the abutting portion 26 is formed, which expands laterally from the side surface S4c of the round flat caulking toward the inner surface of the accommodating portion. In the case of the round flat caulking, unlike the case of the V-shaped caulking in the above embodiment, a protrusion of the round flat caulking does not protrude from the lower end surface of the laminate 10.

In the case where the caulking 20 is the round flat caulking, the present disclosure may have other forms other than a form shown in FIG. 12A or 12B. For example, as shown in FIG. 13A, the protruding portion P4c may be a protrusion bar extending in an annular shape (circular annular shape) along the edge of the top portion P4a (tip end surface). As shown in FIG. 13B, the protruding portion P4c may be a plurality of protrusion bars extending in an arc shape (circular arc shape) along the edge of the top portion P4a (tip end surface). As shown in FIG. 13C, the protruding portion P4c may be a pair of protrusions that protrude from the vicinity of the edge of the top portion P4a (tip end surface).

Figure 14A:
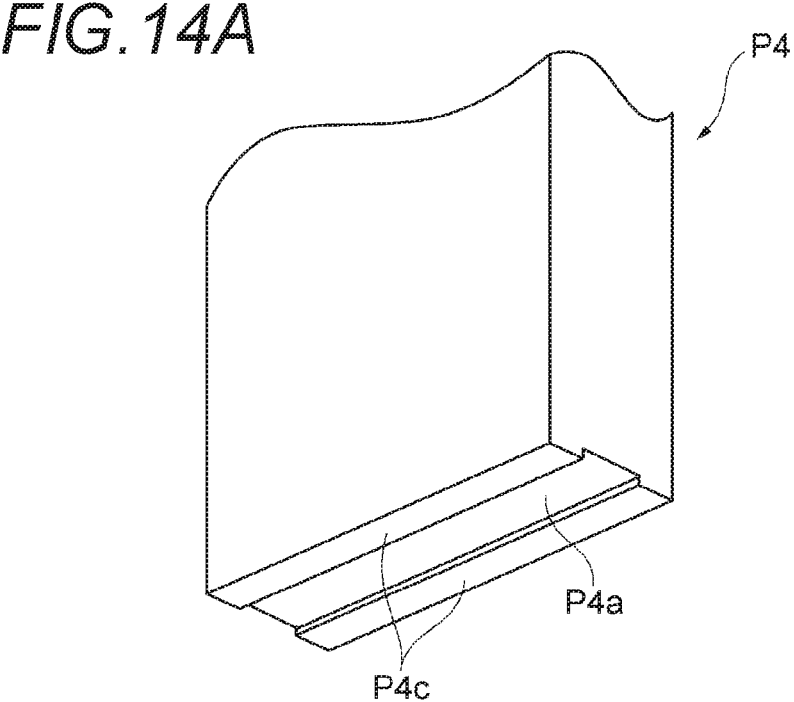
FIG. 14A is a perspective view showing another example of the push punch when viewed from below.
Figure 14B:
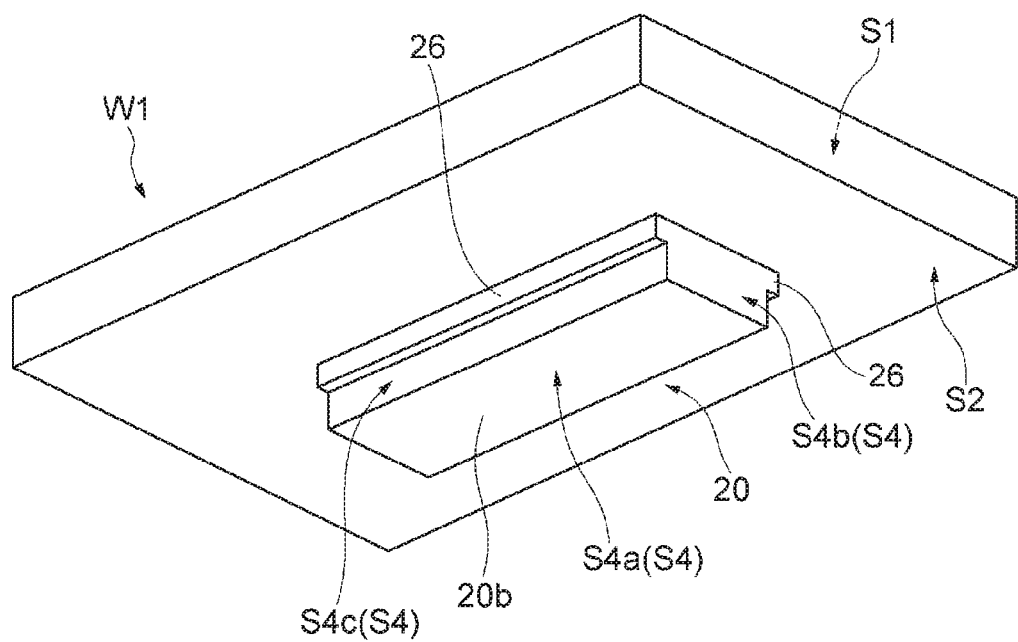
FIG. 14B is a perspective view showing an example of an angled flat caulking when viewed from below.

For example, as shown in FIGS. 14A and 14B, the caulking 20 may be an angled flat caulking. In this case, as shown in FIG. 14A, the top portion P4a of the push punch P4 may be provided with a pair of protruding portions P4c extending in the width direction of the push punch P4. When the caulking 20 is pressed by the push punch P4, as shown in FIG. 14B, the abutting portion 26 is formed, which expands laterally from the side surface S4c of the angled flat caulking toward the inner surface of the accommodating portion. In the case of the angled flat caulking, unlike the case of the V-shaped caulking in the above embodiment, a protrusion of the angled flat caulking does not protrude from the lower end surface of the laminate 10.

Figure 15A:
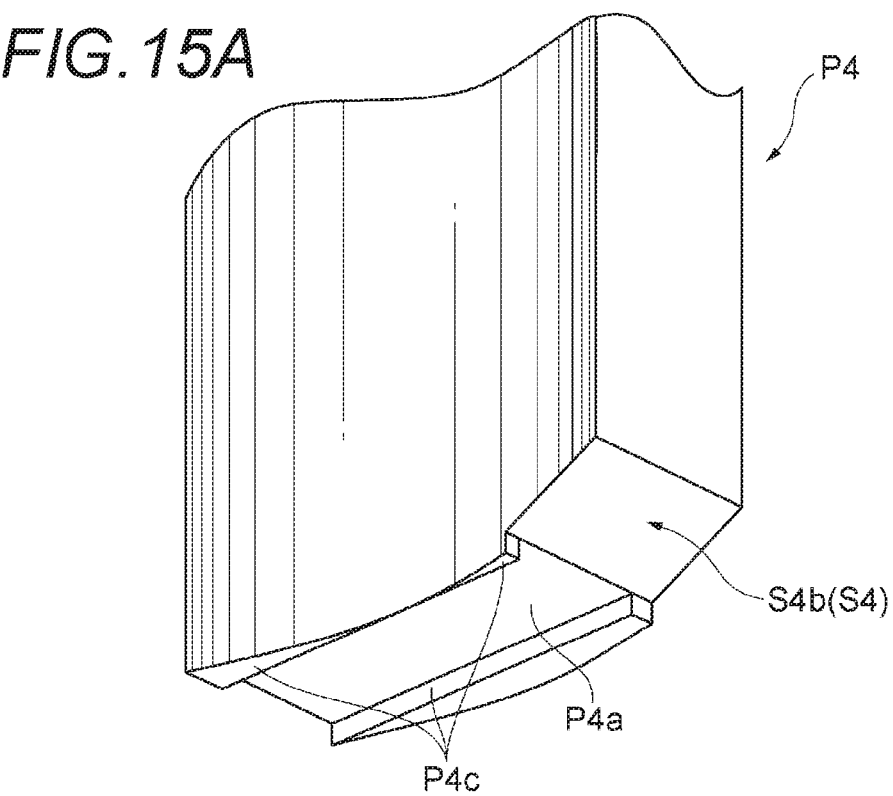
FIG. 15A is a perspective view showing another example of the push punch when viewed from below.
Figure 15B:
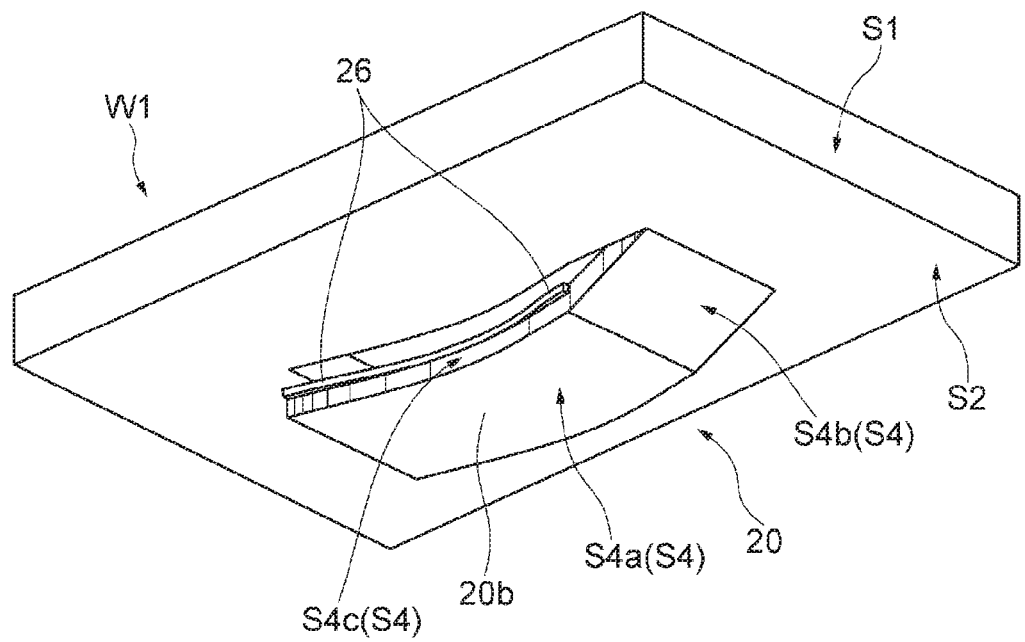
FIG. 15B is a perspective view showing an example of a skew caulking when viewed from below.

For example, as shown in FIGS. 15A and 15B, the caulking 20 may be a skew caulking. In this case, as shown in FIG. 15A, the top portion P4a of the push punch P4 may be provided with a pair of protruding portions P4c extending in the width direction of the push punch P4. When the caulking 20 is pressed by the push punch P4, as shown in FIG. 15B, the abutting portion 26 is formed, which expands laterally from the side surface S4c of the skew caulking toward the inner surface of the accommodating portion.

(3) A shape and a position of the protruding portion P4c provided on the push punch P4 are not particularly limited. For example, although in the above embodiment, the recessed portion 24 formed by the protruding portion P4c is positioned on the bottom surface S3a, the recessed portion 24 may also be positioned on the side surface S3b (inclined surface) or at a boundary portion between the bottom surface S3a and the side surface S3b. In this case, the metal material pushed aside from the recessed portion 24 moves sideways easily as the abutting portion 26. Therefore, the abutting portion 26 abuts against the inner surface of the accommodating portion more easily.

(4) The protruding portion P4c may be positioned in the vicinity of a periphery of the top portion P4a. In this case, the metal material, pushed aside from the recessed portion 24 by the protruding portion P4c, moves sideways easily as the abutting portion 26. Therefore, the abutting portion 26 abuts against the inner surface of the accommodating portion more easily.

(5) The punch portions P10, P20, and P30 may be disposed outside the punching device 130, an electromagnetic steel plate ES1 in which the through hole 22 is formed in the punch portion P10 and an electromagnetic steel plate ES2 on which the caulking 20 is formed in the punch portion P20 may be overlapped with each other, and the caulking 20 may be fitted to the through hole 22 by the push punch P4 of the punch portion P30. Accordingly, a metal laminate, in which two electromagnetic steel plates ES1 and ES2 are laminated, is formed. Thereafter, in the punching device 130, the two punched members W1 and W2 may be punched out from the metal laminate in a state in which the caulking 20 is fitted to the through hole 22. In this case, after the abutting portion 26 formed by the push punch P4 abuts against the inner surface of the accommodating portion to increase the fastening force of the caulking 20, the two punched members W1 and W2 are formed substantially simultaneously from the electromagnetic steel plates ES1 and ES2 (so-called double-taking). Therefore, it is extremely difficult for displacement or twist to occur between the electromagnetic steel plates ES1. ES2 during the double-taking.

(6) Although in the embodiment described above, the abutting portion 26 expands laterally from the side surface S4c toward the inner surface of the accommodating portion, in a case where a clearance between the protrusion 20b and the accommodating portion to which the protrusion 20b is fitted is very small, the abutting portion 26 may not expand visually. Even if the metal material pushed out from the recessed portion 24 by the protruding portion P4c tends to expand toward the inner surface of the accommodating portion, deformation of the metal material can be blocked by the inner surface of the accommodating portion. However, even in this case, the abutting portion 26 can be specified based on a difference in the metal density.

(7) A magnet set in which two or more permanent magnets 12 are combined may be inserted into each magnet insertion hole 16. In this case, in one magnet insertion hole 16, the plurality of permanent magnets 12 may be arranged in a longitudinal direction of the magnet insertion hole 16. In the one magnet insertion hole 16, the plurality of permanent magnets 12 may also be arranged in an extending direction of the magnet insertion hole 16. In the one magnet insertion hole 16, a plurality of permanent magnets 12 may be arranged in the longitudinal direction while a plurality of permanent magnets 12 may be arranged in the extending direction.

(8) Although the rotor laminated iron core 1 is described in the above embodiment, the present disclosure may also be applied to a stator laminated iron core. In this case, the stator laminated iron core may be a split stator laminated iron core in which a plurality of iron core pieces are combined or a non-split stator laminated iron core. Alternatively, the present disclosure may be applied to other metal laminates, such as a two-ply lead frame.

EXAMPLES

Example 1

A metal laminate (1) according to an example of the present disclosure includes a laminate (10) in which a first metal plate (W1) and a second metal plate (W2) are laminated. The first metal plate (W1) includes a caulking (20) that exhibits a mountain shape protruding from a back surface (S2) side of the first metal plate (W1) and recessed on a front surface (S1) side of the first metal plate (W1). The second metal plate (W2) includes an accommodating portion (20a, 22) configured to accommodate the caulking (20) of the first metal plate (W1) such that the caulking (20) is fitted to the accommodating portion (20a, 22). The caulking (20) of the first metal plate (W1) includes: a recessed portion (24) provided on an inner concave surface (S3) of the caulking (20) and recessed toward the back surface (S2) side of the first metal plate (W1); and an abutting portion (26) provided on an outer convex surface (S4) of the caulking (20) and abutted against an inner surface of the accommodating portions (20a, 22) of the second metal plate (W2) at a position corresponding to the recessed portion (24). The abutting portion (26) of the caulking (20) of the first metal plate (W1) expands laterally from the outer convex surface (S4) toward the inner surface of the accommodating portions (20a, 22) of the second metal plate (W2). In this case, since the laterally expanding abutting portion of the caulking abuts against the inner surface of the accommodating portion, contact pressure is increased between the caulking and the accommodating portion. That is, a frictional force acting between the abutting portion and the inner surface of the accommodating portion increases. Therefore, a fastening force of the caulking can be significantly improved. As a result, even if a stress is applied in a direction in which the first metal plate and the second metal plate are separated from each other, the first metal plate is difficult to be peeled off with respect to the second metal plate.

Example 2

In the metal laminate (1) according to Example 1, a metal density of the abutting portion (26) of the caulking (20) may be higher than metal densities of remaining portions of the caulking (20). In this case, it is considered that the metal density of the abutting portion is higher than the other portions as a result of a reaction force from the accommodating portion acting on the abutting portion abutting against the accommodating portion. That is, a larger contact pressure acts between the abutting portion and the accommodating portion. Therefore, the fastening force of the caulking can be further improved.

Example 3

A metal laminate (1) according to another example of the present disclosure includes a laminate (10) in which a first metal plate (W1) and a second metal plate (W2) are laminated. The first metal plate (W1) includes a caulking (20) that exhibits a mountain shape protruding from a back surface (S2) side of the first metal plate (W1) and recessed on a front surface (S1) side of the first metal plate (W1). The second metal plate (W2) includes an accommodating portion (20a, 22) configured to accommodate the caulking (20) of the first metal plate (W1) such that the caulking (20) is fitted to the accommodating portion (20a, 22) of the second metal plate (W2). The caulking (20) of the first metal plate (W1) includes: a recessed portion (24) provided on an inner concave surface (S3) of the caulking (20) and recessed toward the back surface (S2) side of the first metal plate (W1); and an abutting portion (26) abutted against an inner surface of the accommodating portions (20a, 22) of the second metal plate (W2) at a position corresponding to the recessed portion (24). A metal density of the abutting portion (26) of the caulking (20) is higher than metal densities of remaining portions of the caulking (20). In this case, it is considered that the metal density of the abutting portion is higher than the remaining portions as a result of a reaction force from the accommodating portion acting on the abutting portion abutting against the accommodating portion. Therefore, contact pressure is increased between the caulking and the accommodating portion. That is, a frictional force acting between the abutting portion and the inner surface of the accommodating portion increases. Therefore, a fastening force of the caulking can be significantly improved. As a result, even if a stress is applied in a direction in which the first metal plate and the second metal plate are separated from each other, the first metal plate is difficult to be peeled off with respect to the second metal plate.

Example 4

In the metal laminate (1) according to any one of Examples 1 to 3, an end portion of the recessed portion (24) may extend toward the abutting portion (26) without reaching the abutting portion (26). In this case, a contact area between the abutting portion and the inner surface of the accommodating portion increases as compared with a case where the end portion of the recessed portion reaches the abutting portion. Therefore, the fastening force of the caulking can be further improved.

Example 5

In the metal laminate (1) according to any one of Examples 1 to 4, the inner concave surface (S3) may include a bottom surface (S3a) and a side surface (S3b) rising from the bottom surface (S3a), and the recessed portion (24) may be provided on the bottom surface (S3a). In this case, the metal material pushed aside from the recessed portion moves sideways easily as the abutting portion. Therefore, the abutting portion abuts against the inner surface of the accommodating portion more easily.

Example 6

In the metal laminate (1) according to any one of Examples 1 to 4, the caulking (20) may be V-shaped caulking, the inner concave surface (S3) may include the bottom surface (S3a) and the inclined surface (S3b) rising from the bottom surface (S3a), and the recessed portion (24) may be provided on the inclined surface (S3b) or at a boundary portion between the bottom surface (S3a) and the inclined surface (S3b). In this case, the metal material pushed aside from the recessed portion moves sideways easily as the abutting portion. Therefore, the abutting portion abuts against the inner surface of the accommodating portion more easily.

Example 7

In the metal laminate (1) according to any one of Examples 1 to 6, a width of the abutting portion (26) is larger than a width of the recessed portion (24) in a direction orthogonal to a direction in which the recessed portion (24) and the abutting portion (26) are arranged. In this case, the contact area between the abutting portion and the inner surface of the accommodating portion increases. Therefore, the fastening force of the caulking can be further improved.

Example 8

In the metal laminate (1) according to any one of Examples 1 to 7, the inner concave surface (S3) of the caulking (20) may include the bottom surface (S3a) and the side surface (S3b) rising from the bottom surface (S3a), and the recessed portion (24) may be positioned in the vicinity of a periphery of the bottom surface (S3a). In this case, the metal material pushed aside by the recessed portion moves sideways easily as the abutting portion. Therefore, the abutting portion abuts against the inner surface of the accommodating portion more easily.

Example 9

A method of manufacturing a metal laminate (1) according to another example of the present disclosure includes: providing a first metal plate (W1) and a second metal plate (W2), the first metal plate (W1) includes a caulking (20) that exhibits a mountain shape protruding from a back surface (S2) side of the first metal plate (W1) and recessed on a front surface side of the first metal plate (W1), and the second metal plate includes an accommodating portion (20a, 22) configured to accommodate the caulking (20) of the first metal plate (W1). The method also includes laminating the first metal plate (W1) and the second metal plate (W2) such that the caulking (20) of the first metal plate (W1) is fitted to the accommodating portion (20a, 22) of the second metal plate (W2). The laminating of the first and second metal plates (W1, W2) includes: pressing a push punch (P4), which is provided with a protrusion (P4c) on a tip end surface (P4a) thereof, against an inner concave surface (S3) of the caulking (20) of the first metal plate (W1) to form a recessed portion (24) in the inner concave surface (S3) of the caulking (20); and forming an abutting portion (26) in the caulking (20), configured to be abutted against an inner surface of the accommodating portion (20a, 22) of the second metal plate (W2) at a position corresponding to the recessed portion (24) when the caulking (20) is fitted to the accommodating portion (20a, 22). In this case, the protrusion of the tip end surface of the push punch crushes a part of the inner concave surface of the caulking to form the recessed portion. At this time, metal material pushed aside by the protrusion is directed laterally from an outer convex surface of the caulking toward the inner surface of the accommodating portion. Accordingly, the abutting portion that abuts against the inner surface is formed, and contact pressure is increased between the caulking and the accommodating portion. That is, a frictional force acting between the abutting portion and the inner surface of the accommodating portion increases. Therefore, a fastening force of the caulking can be significantly improved. As a result, even if a stress is applied in a direction in which the first metal plate and the second metal plate are separated from each other, the first metal plate is difficult to be peeled off with respect to the second metal plate.

Example 10

The method according to Example 9 may further include: pressing a first punch (P2) against a belt-like metal material to form the caulking (20) on the metal material; pressing a second punch (P1) against the metal material to form the accommodating portions (20a, 22) on the metal material; and pressing a third punch (P3) against the metal material to punch out the second metal plate (W2) including the accommodating portions (20a, 22) from the metal material. The laminating of the first and second metal plates (W1, W2) may further include pressing the third punch (P3) against the metal material to punch out the first metal plate (W1) including the caulking (20) from the metal material and fitting the caulking (20) to the accommodating portion (20a, 22). In this case, punching the first metal plate and forming the abutting portion by the push punch can be performed at the same timing or at close timings.

Example 11

The method according to Example 9 may further include: pressing the third punch (P3) against laminated first and second metal plates (ES1, ES2) to punch out the two punched portions (W1, W2) from the first and second metal plates (ES1, ES2) in a state in which the caulking (20) is fitted to the accommodating portion (20a, 22). In this case, after the abutting portion formed by the push punch abuts against the inner surface of the accommodating portion to increase the fastening force of the caulking, the two punched members are formed substantially simultaneously from the two metal plates (so-called double-taking). Therefore, it is extremely difficult for displacement or twist to occur between the first and second metal plates during the double-taking.

Example 12

In the method according to any one of Examples 9 to 11, the abutting portion (26) may expand laterally from an outer convex surface (S4) of the caulking (20) toward the inner surface. In this case, since the laterally expanding abutting portion abuts against the inner surface of the accommodating portion, the contact pressure is further increased between the caulking and the accommodating portion. Therefore, the fastening force of the caulking can be further improved.

Example 13

In the method according to any one of Examples 9 to 12, a metal density of the abutting portion (26) may be higher than metal densities of remaining portions of the caulking (20). In this case, it is considered that the metal density of the abutting portion is higher than the remaining portions as a result of a reaction force from the accommodating portion acting on the abutting portion abutting against the accommodating portion. That is, a larger contact pressure acts between the abutting portion and the accommodating portion. Therefore, the fastening force of the caulking can be further improved.

Example 14

In the method according to any one of Examples 9 to 13, the laminating of the first and second metal plates (W1, W2) may include: supporting a bottom portion (S4a) of the outer convex surface (S4) of the caulking (20) by a support surface (132b) when the push punch (P4) is pressed against the inner concave surface (S3) of the caulking (20). In this case, the bottom portion of the outer convex surface, which is opposite to the inner concave surface on which the push punch is applied, is supported by the support surface. Therefore, the metal material pushed aside by the protrusion of the tip end surface of the push punch is easy to move laterally from the outer convex surface of the caulking toward the inner surface of the accommodating portion, instead of moving from the bottom portion of the outer convex surface. Therefore, the abutting portion abuts against the inner surface of the accommodating portion more easily.

Example 15

In the method according to any one of Examples 9 to 14, an end portion of the recessed portion (24) may extend toward the abutting portion (26) without reaching the abutting portion (26). In this case, the same effect as Example 4 is obtained.

Example 16

In the method according to any one of Examples 9 to 15, the inner concave surface (S3) may include a bottom surface (S3a) and a side surface (S3b) rising from the bottom surface (S3a), and the recessed portion (24) may be provided on the bottom surface (S3a). In this case, the same effect as Example 5 is obtained.

Example 17

In the method according to any one of Examples 9 to 15, the caulking (20) may be V-shaped caulking, the inner concave surface (S3) may include the bottom surface (S3a) and the inclined surface (S3b) rising from the bottom surface (S3a), and the recessed portion (24) may be provided on the inclined surface (S3b) or at a boundary portion between the bottom surface (S3a) and the inclined surface (S3b). In this case, the same effect as Example 6 is obtained.

Example 18

In the method according to any one of Examples 9 to 17, a width of the abutting portion (26) is larger than a width of the recessed portion (24) in a direction orthogonal to a direction in which the recessed portion (24) and the abutting portion (26) are arranged. In this case, the same effect as Example 7 is obtained.

Example 19

In the method according to any one of Examples 9 to 18, the inner concave surface (S3) may include the bottom surface (S3a) and the side surface (S3b) rising from the bottom surface (S3a), and the recessed portion (24) may be positioned in the vicinity of a periphery of the bottom surface (S3a). In this case, the same effect as Example 8 is obtained.

The reference numerals and signs of the elements according to the embodiments of the present disclosure are listed below only for a reference.
1: rotor laminated iron core (metal laminate)
10: laminate
18: caulking portion
20: caulking
20a: recess (accommodating portion)
20b: protrusion
22: through hole (accommodating portion)
24: recessed portion
26: abutting portion
100: manufacturing apparatus
130: punching device
132b: cylinder (support surface)
140: controller (control unit)
d2: width of recessed portion
d3: width of abutting portion
ES: electromagnetic steel
ES1: electromagnetic steel (first metal plate)
ES2: electromagnetic steel (second metal plate)
P1: punch (second punch)
P2: punch (first punch)
P3: punch (third punch)
P4: push punch
P4a: top portion (tip end surface)
P4c: protruding portion (protrusion)
P10, P20, P30: punch portion
S1: surface
S2: back surface
S3: inner concave surface
S3a: bottom surface
S3b: side surface (inclined surface)
S4: outer convex surface S4*a*: bottom surface
S4*b*, S4*c*: side surface
W: punched member
W1: punched member (first metal plate)
W2: punched member (second metal plate)

What is claimed is:

1. A metal laminate, comprising:
a laminate, in which a first metal plate and a second metal plate are laminated, wherein
the first metal plate includes a caulking that exhibits a mountain shape protruding from a back surface side of the first metal plate and recessed on a front surface side of the first metal plate,
the second metal plate includes an accommodating portion accommodating the caulking of the first metal plate such that the caulking is fitted to the accommodating portion,
the caulking of the first metal plate includes:
a recessed portion provided on an inner concave surface of the caulking and recessed toward the back surface side of the first metal plate, the inner concave surface being defined by longitudinal side surfaces positioned on opposite sides of a bottom surface, wherein the recessed portion is formed to extend along the bottom surface and is spaced from a center of the bottom surface;
an abutting portion that includes a first and a second abutment abutted against an inner surface of the accommodating portion of the second metal plate and formed along an extending direction of the recessed portion at positions outside of the recessed portion,
the recessed portion includes at least first and second recesses provided on the inner concave surface, and
a metal density of the abutting portion of the caulking is higher than a metal density of a remaining portion of the caulking; and
an outer convex surface positioned in an opposite side of the inner concave surface,
the outer convex surface of the caulking includes:
a first side surface that connects the bottom surface of the inner concave surface with the outer convex surface, and that faces with the inner surface of the accommodating portion,
a second side surface that connects the bottom surface of the inner concave surface with the outer convex surface, faces with the inner surface of the accommodating portion, and that is positioned on an opposite side of the first side surface, and
the first abutment is provided on the first side surface and the first recess is provided adjacent to a side of the first abutment, and the second abutment is provided on the second side surface and the second recess is provided adjacent to a side of the second abutment.

2. The metal laminate according to claim 1, wherein the recessed portion extends longitudinally between the longitudinal side surfaces.

3. The metal laminate according to claim 1, wherein each of the longitudinal side surfaces is inclined.

* * * * *